July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 1

INVENTORS
JOSE REINES
LAWRENCE P. HORWITZ
GLENMORE L. SHELTON, JR.

BY Francis J. Thomas
ATTORNEY

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961

26 Sheets-Sheet 5

REFERENCE PATTERNS

TEST PATTERNS (GROUP 1)

TEST PATTERNS (GROUP 2)

FIG. 14

CORRELATION TABLE

| SPECIMEN | | | D(x',y') COMPARISON | | | V(x',y') COMPARISON | | | V*(x',y') COMPARISON | | | | | |
|---|---|---|---|---|---|---|---|---|---|---|---|---|---|---|
| | | | | | | | | | BINARY | | | TERTIARY | | |
| | | | TO REF. A | TO REF. B | TO REF. R | TO REF. A | TO REF. B | TO REF. R | TO REF. A | TO REF. B | TO REF. R | TO REF. A | TO REF. B | TO REF. R |
| IDEAL | | A | 1.000 | 0.930 | 0.931 | 1.000 | 0.493 | 0.525 | 1.000 | 0.584 | 0.578 | 1.000 | 0.044 | 0.079 |
| | | B | 0.930 | 1.000 | 0.982 | 0.493 | 1.000 | 0.700 | 0.584 | 1.000 | 0.652 | 0.044 | 1.000 | 0.323 |
| | | R | 0.931 | 0.982 | 1.000 | 0.525 | 0.700 | 1.000 | 0.578 | 0.652 | 1.000 | 0.079 | 0.323 | 1.000 |
| TEST PATTERNS | GROUP 1 | A | 0.965 | 0.940 | 0.948 | 0.620 | 0.388 | 0.424 | 0.296 | 0.202 | 0.186 | 0.190 | -0.025 | -0.024 |
| | | B | 0.919 | 0.973 | 0.969 | 0.415 | 0.643 | 0.510 | 0.194 | 0.334 | 0.270 | -0.030 | 0.251 | 0.112 |
| | | R | 0.915 | 0.959 | 0.978 | 0.441 | 0.482 | 0.648 | 0.208 | 0.254 | 0.335 | 0.002 | 0.098 | 0.233 |
| | GROUP 2 | A | 0.885 | 0.905 | 0.916 | 0.430 | 0.351 | 0.363 | 0.085 | 0.043 | 0.034 | 0.069 | -0.011 | -0.023 |
| | | B | 0.868 | 0.916 | 0.923 | 0.355 | 0.449 | 0.405 | 0.022 | 0.099 | 0.053 | -0.006 | 0.091 | 0.052 |
| | | R | 0.864 | 0.911 | 0.926 | 0.363 | 0.396 | 0.461 | 0.055 | 0.090 | 0.105 | 0.035 | 0.081 | 0.116 |

FLIP-FLOP

"AND" GATE

DELAY CIRCUIT

AMPLIFIER

INTEGRATOR

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 12

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 15

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 16

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 20

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 21

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961 26 Sheets-Sheet 23

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961

26 Sheets-Sheet 24

July 20, 1965 J. REINES ETAL 3,196,396

SPECIMEN IDENTIFICATION TECHNIQUES EMPLOYING BINARY NON-LINEAR FUNCTIONS OF AUTOCORRELATION FUNCTIONS

Filed June 7, 1961

26 Sheets-Sheet 25

United States Patent Office 3,196,396
Patented July 20, 1965

3,196,396

SPECIMEN IDENTIFICATION TECHNIQUES EMPLOYING BINARY NON-LINEAR FUNCTIONS OF AUTOCORRELATION FUNCTIONS

Jose Reines, Crompond, Lawrence P. Horwitz, Chappaqua, and Glenmore L. Shelton, Jr., Carmel, N.Y., assignors to International Business Machines Corporation, New York, N.Y., a corporation of New York Filed June 7, 1961, Ser. No. 115,501
25 Claims. (Cl. 340—146.3)

This invention relates to specimen identification and in particular, to apparatus and methods wherein non-linear functions of autocorrelation functions of the specimens to be identified are compared to non-linear functions of autocorrelation functions of reference patterns.

Many specimen identification devices utilize direct comparison between the specimen to be identified and reference patterns. In these devices, either vertical or horizontal misregistration of the specimen affects the comparison and the document containing the specimen must be held in a fixed position during identification.

The present invention uses comparison of functions of autocorrelation functions for identification. The autocorrelation function of a specimen provides a measure of the correlation of the specimen with itself, through various displacements and, hence, is inherently registration invariant. Furthermore, specimens may be identified while the document is in motion because of the registration invariance of the system. Specimen identification techniques utilizing autocorrelation function comparison are taught in an article by L. P. Horwitz and Glenmore L. Shelton, Jr., entitled Pattern Recognition Using Autocorrelation which appears in the Proceedings of the Institute of Radio Engineers for January 1961, volume 49, number 1, on pages 175–185.

Certain linear functions of the autocorrelation functions have been found to enhance identification while retaining the characteristic of registration invariance. Among these functions are the smoothing and discriminating functions which are described in an application filed on July 25, 1960 by Lawrence P. Horwitz and Glenmore L. Shelton, Jr., Serial Number 45,034, entitled Specimen Identification Apparatus and Method. Identification is further enhanced by utilizing comparison of non-linear functions of autocorrelation functions as described in an application filed on March 3, 1961 by Lawrence P. Horwitz and Glenmore L. Shelton, Jr., Serial Number 93,070, entitled Specimen Identification Apparatus and Method.

The present invention makes use of a particular non-linear function of the autocorrelation function which radically simplifies the identification logic and circuitry and enhances the circuit stability due to a decreased dynamic range of discrimination. These features and advantages will be further considered with respect to the detailed description of the preferred embodiments of the invention. The particular non-linear function which forms the basis of the embodiments is a binary function of a "second-difference" function (which is a type of discriminating function) of the autocorrelation function. This binary function may be considered to be a type of threshold or boundary function because it is inherently representative of the boundary of that portion of the "second-difference" function whose values exceed a threshold. As such, the binary function is representative of the important discriminating features within the specimen and relatively independent of many specimen irregularities.

An object of this invention is to provide specimen identification apparatus and methods making use of non-linear functions of autocorrelation functions of the specimens to enhance identification.

A further object is to provide a specimen identification apparatus and method making use of comparison of binary functions of autocorrelation functions of the specimens to obtain enhanced discrimination.

A further object is to provide a specimen identification method and apparatus making use of comparisons of non-linear functions of "second-difference" functions of autocorrelation functions of the specimens to obtain enhanced identification.

Another object is to provide a specimen identification method and apparatus using non-linear functions of "second-difference" functions of autocorrelation functions for comparison, where the non-linear function is a binary function.

Another object is to provide a specimen identification method and apparatus making use of comparison of a binary function of a discriminating function of the autocorrelation function of the specimen with similar functions of reference patterns, where the binary function assumes one value where the discriminating function has a value that is greater than a threshold and a second value where the discriminating function has a value that is less than the threshold.

A further object is to provide a specimen identification method and apparatus making use of comparison of a binary function of a discriminating function of the autocorrelation function of the specimen with similar functions of reference patterns, where the binary function assumes one value where the discriminating function is one of polarity and a second value where the discriminating function is zero or of a second polarity.

A further object is to provide a specimen identification method and apparatus making use of comparison of a binary function of a "second-difference" function of the autocorrelation function of the specimen with similar functions of reference patterns, where the binary function assumes one value where the "second-difference" function is of one polarity and a second value where the "second-difference" function is zero or of a second polarity.

A further object is to provide a specimen identification method and apparatus making use of comparison of a binary function of a "second-difference" function of the autocorrelation function of the specimen with similar functions of reference patterns, where the binary function assumes one value where the "second-difference" function is negative and a second value where the "second-difference" function is positive or zero.

Another object is to provide an electronic specimen identification apparatus where a binary function of a discriminating function of the autocorrelation function of discrete portions of the input specimen are generated and compared with similar functions of discrete portions of reference patterns.

The foregoing and other objects, features and advantages of the invention will be apparent from the following description of preferred embodiments.

In accordance with the invention, the autocorrelation function of the specimen is electronically generated. A binary function of a particular discriminating function, the "second-difference" function, of the autocorrelation function is then generated and compared to similar functions of reference patterns. The binary function that is used assumes a first value where the "second-difference" function is positive or zero and a second value where the "second-difference" function is negative. The "second-difference" function, if considered in two dimensions, is negative along its periphery and hence, the binary function is indicative of the boundary of the non-negative values.

The autocorrelation function is a measure of the correlation of a function with itself and is thus inherently registration invariant. If the specimen to be identified is considered to be a matrix of discrete areas having coordinates $(x, y)$ that are predominantly black or predominantly white, depending then upon the positions of the lines that the specimen comprises, there is a function $f(x, y)$ that is "1" for each instance where the area about the coordinates $(x, y)$ is black and "0" where white. The autocorrelation function defines the number of pairs of black areas separated by a given distance in a given direction, over all distances and directions. If $(x, y)$ is a point on the pattern, and $(x+x', y+y')$ is another point on the pattern separated from the point $(x, y)$ by $(x', y')$ then the product $f(x, y)f(x+x', y+y')=1$ only where both points are black. Since this procedure is performed on every pair of points in the pattern, the autocorrelation function $D(x', y')$ is defined as:

$$D(x', y')=\sum_{x, y} f(x, y)f(x+x', y+y')$$

One of the discriminating functions which enhances specimen identification is entitled the "second-difference" function of the autocorrelation function. This function $V(x', y')$ is defined as the function whose value at a point $(x', y')$ is obtained by multiplying the value of the autocorrelation function at the point $(x', y')$ by four and then subtracting the values of the autocorrelation function at the four adjacent points $(x'+1, y')$, $(x'-1, y')$, $(x', y'+1)$ and $(x', y'-1)$. This may be defined as:

$$V(x', y')=4D(x', y')-D(x'+1, y') \\ -D(x'-1, y')-D(x', y'+1)-D(x', y'-1)$$

The autocorrelation function may be written in matrix form as follows:

criminating functions may be obtained by the use of other operator matrices. In general, the use of an operator matrix having one or more positive elements and one or more negative elements will result in a discriminating function. Another group of discriminating functions is obtained by non-linearly operating on the autocorrelation function.

The "second-difference" function of the autocorrelation function may be used directly as the basis for comparison and the specimen identification system will have enhanced discrimination over that obtained by direct autocorrelation function comparison. The use of certain non-linear functions of the "second-difference" function further enhances discrimination and simplifies the apparatus required. In the embodiments to be described in detail below, the non-linear function is obtained by assigning a value of +1 to all positive and zero values of the "second-difference" function and a value of −1 to all negative values. This function of the "second-difference" function $V(x', y)$ of the autocorrelation function $D(x',y')$ is written is: $V^*(x', y')$ and is one example of a non-linear discriminating function of the autocorrelation function. The function $V_S^*(x', y')$ of the specimen S is then compared, point-by-point, to each similar function $V_{R_n}^*(x', y')$ of the "second-difference" function $V_{R_n}(x', y')$ of the autocorrelation function of each reference pattern $R_n$ to generate sums $S_{S, R_n}$ as follows:

$$S_{S, R_n}=\sum_{x', y'} V_S^*(x', y')V_{R_n}(x', y')$$

The reference pattern "$n$" that produces the largest comparison sum determines the identification of the specimen. Ordinarily this type of comparison must be normalized to guarantee that the largest sum will be caused by the ref-

| | | | | |
|---|---|---|---|---|
| D(−n,m) . . . D(−2,m) | D(−1,m) | D(0,m) | D(1,m) | D(2,m) . . . D(n,m) |
| ⋮ ⋮ | ⋮ | ⋮ | ⋮ | ⋮ ⋮ |
| D(−n,2) . . . D(−2,2) | D(−1,2) | D(0,2) | D(1,2) | D(2,2) . . . D(n,2) |
| D(−n,1) . . . D(−2,1) | D(−1,1) | D(0,1) | D(1,1) | D(2,1) . . . D(n,1) |
| D(−n,0) . . . D(−2,0) | D(−1,0) | D(0,0) | D(1,0) | D(2,0) . . . D(n,0) |
| D(−n,−1) . . . D(−2,−1) | D(−1,−1) | D(0,−1) | D(1,−1) | D(2,−1) . . . D(n,−1) |
| D(−n,−2) . . . D(−2,−2) | D(−1,−2) | D(0,−2) | D(1,−2) | D(2,−2) . . . D(n,−2) |
| ⋮ ⋮ | ⋮ | ⋮ | ⋮ | ⋮ ⋮ |
| D(−n,−m) . . . D(−2,−m) | D(−1,−m) | D(0,−m) | D(1,−m) | D(2,−m) . . . D(n,−m) |

The value at each point of the "second-difference" function is then obtained by summing the products obtained by a point-by-point multiplication of this matrix and the "second-difference" operator matrix:

$$\begin{matrix} 0 & -1 & 0 \\ -1 & 4 & -1 \\ 0 & -1 & 0 \end{matrix}$$

where the center point of the operator matrix is located at the coordinates corresponding to the coordinates of the point of the "second-difference" function that is to be evaluated. For example, the value of the "second-difference" function at a point (3, 4) is obtained by summing the products obtained by a point-by-point multiplication of $$\begin{matrix} 0 & -1 & 0 \\ -1 & 4 & -1 \\ 0 & -1 & 0 \end{matrix} \text{ and } \begin{matrix} D(2,5) & D(3,5) & D(4,5) \\ D(2,4) & D(3,4) & D(4,4) \\ D(2,3) & D(3,3) & D(4,3) \end{matrix}$$

This value $V(3, 4)$ is thus obtained as follows:

$$V(3, 4)=4D(3, 4)-D(3, 5) \\ -D(2, 4)-D(4, 4)-D(3, 3)$$

The "second-difference" function contains more points than the original autocorrelation function from which it is developed because non-trivial results are obtained when the operator matrix is centered along rows $(m+1)$ and $(-m+1)$ and along columns $(n+1)$ and $(-n-1)$ of an $m$ x $n$ autocorrelation function matrix. Other diserence pattern that is similar to the specimen and normalization would be accomplished by dividing $S_{S, R_n}$ by:

$$\left[\sum_{x', y'} V_{R_n}^{*2}(x', y')\right]^{1/2}$$

The Schwartz inequality found on page 417 of a text authored by Wilfred Kaplan entitled Advanced Calculus, 1952 and published by the Addison-Wesley Publishing Co., may be used to show that:

$$\sum_{x', y'} \frac{V_S^*(x', y')V_{R_n}^*(x', y')}{\left[\sum_{x', y'} V_{R_n}^{*2}(x', y')\right]^{1/2}}$$

is a maximum where $V_S^*(x', y')=V_{R_n}^*(x', y')$ and hence the reference pattern $R_n$ which is similar to the specimen S provides the largest sum $S_{S, R}$. It will be shown below, however, that the same normalization factor is generated for all reference patterns and may be ignored when using the particular binary function shown in the preferred embodiments.

Non-linear functions $D_S^*(x', y')$ of the autocorrelation function $D_S(x', y')$ may be compared with similar functions $D_R^*(x', y')$ of the reference patterns according to the following formula:

$$S_{S, R}=\sum_{x', y'} \frac{D_S^*(x', y')D_R^*(x', y')}{\left[\sum_{x', y'} D_R^{*2}(x', y')\right]^{1/2}}$$

Since $V_S(x', y')$ is a function of $D_S(x', y')$ and since $V_S^*(x', y')$ is a non-linear function of $V_S(x', y')$, $V_S^*$ is thus a non-linear function of $D_S(x', y')$ and $V_S^*(x', y')$ may be considered to be a special example of $D_S^*(x', y')$.

The invention will be described in greater detail in connection with the accompanying drawings:

Figure 12A:
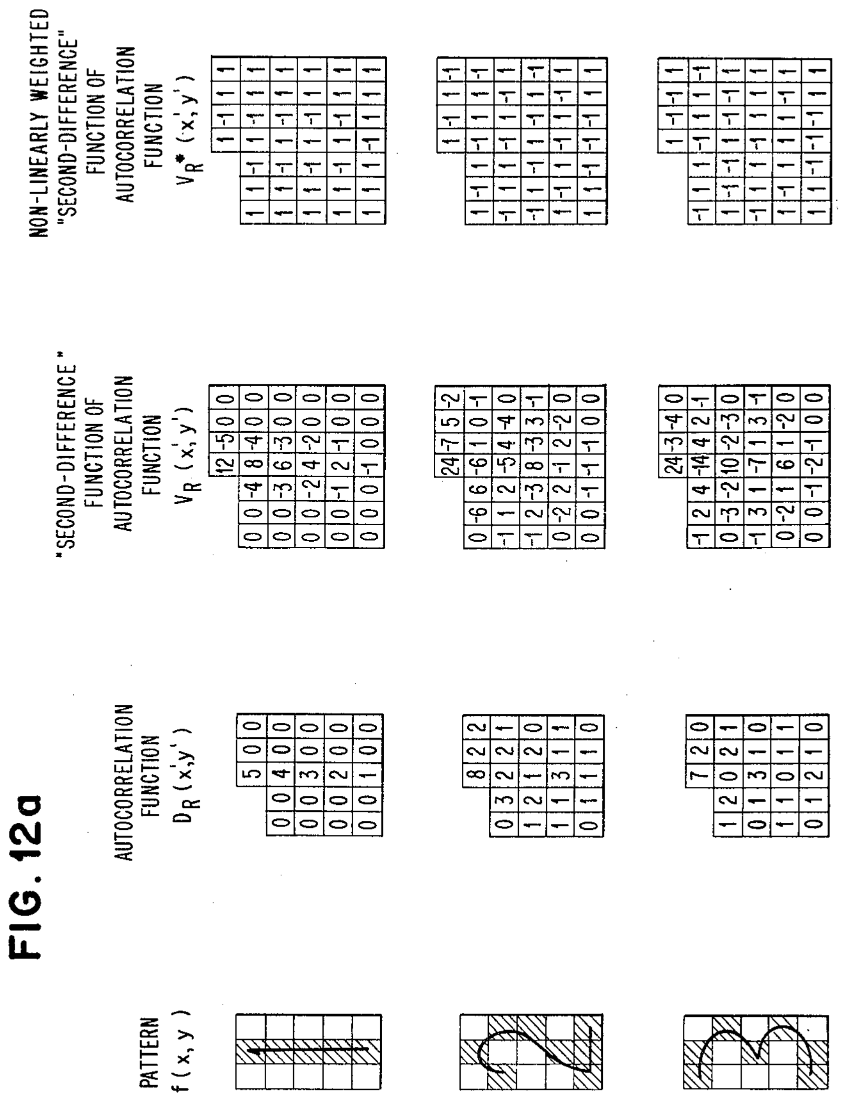
Figure 12B:
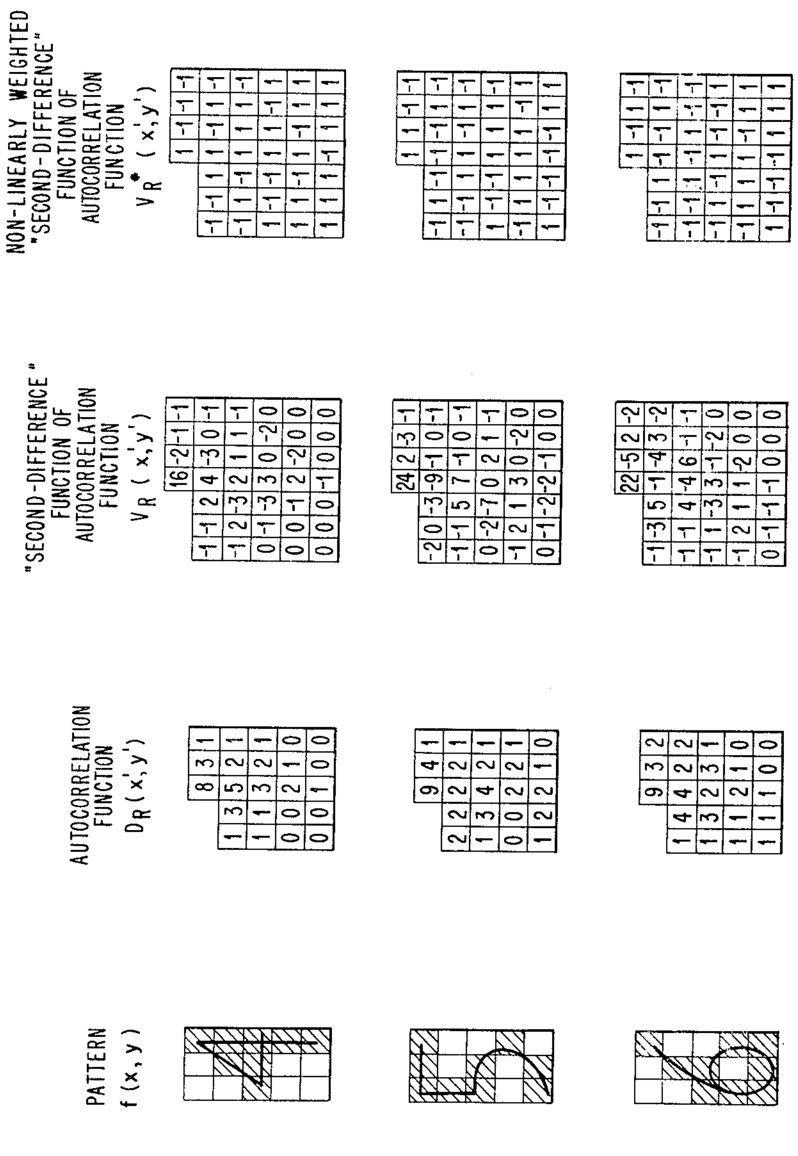
Figure 12C:
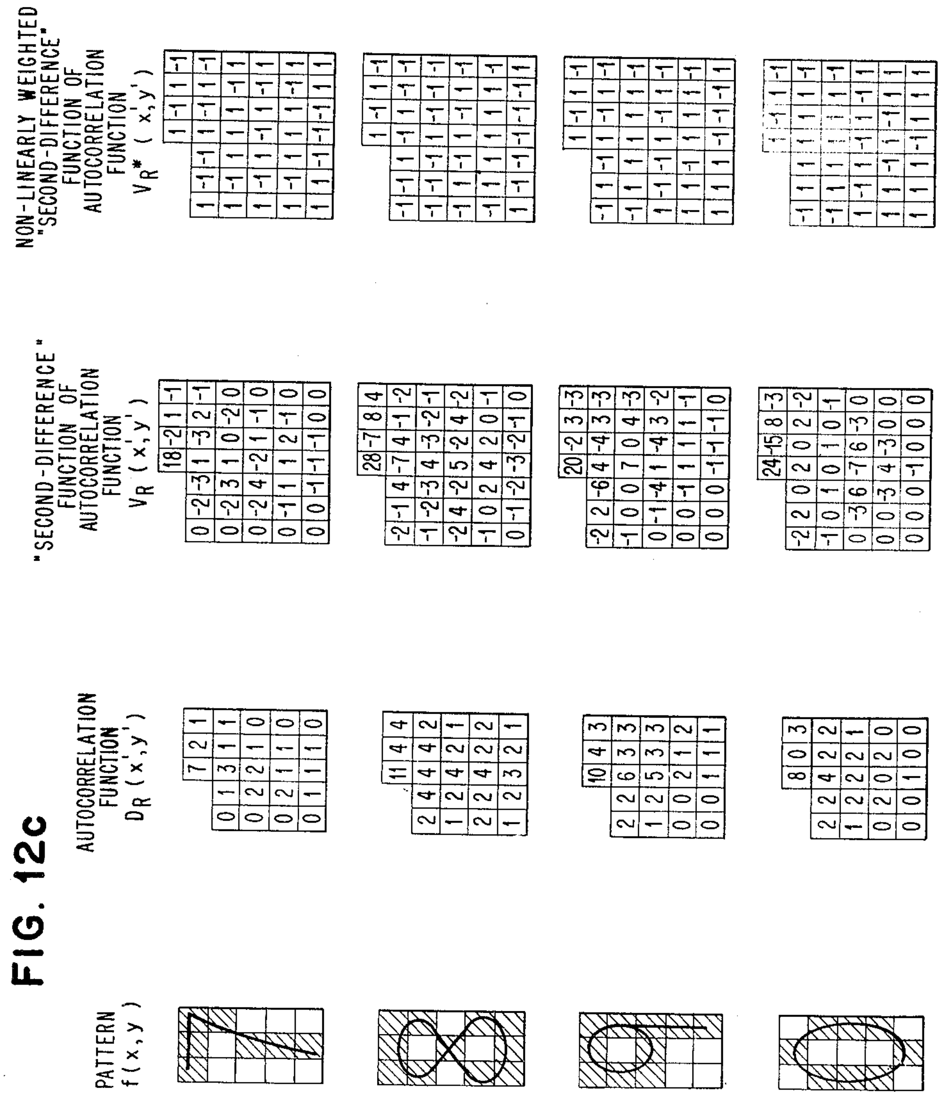

FIGURE 12*a*, 12*b*, and 12*c* compose a chart showing the autocorrelation functions, the "second-difference" functions of the autocorrelation functions, and non-linearly weighted "second-difference" functions (binary boundary functions) of the autocorrelation functions of ten arabic numerals.

Figure 13A:
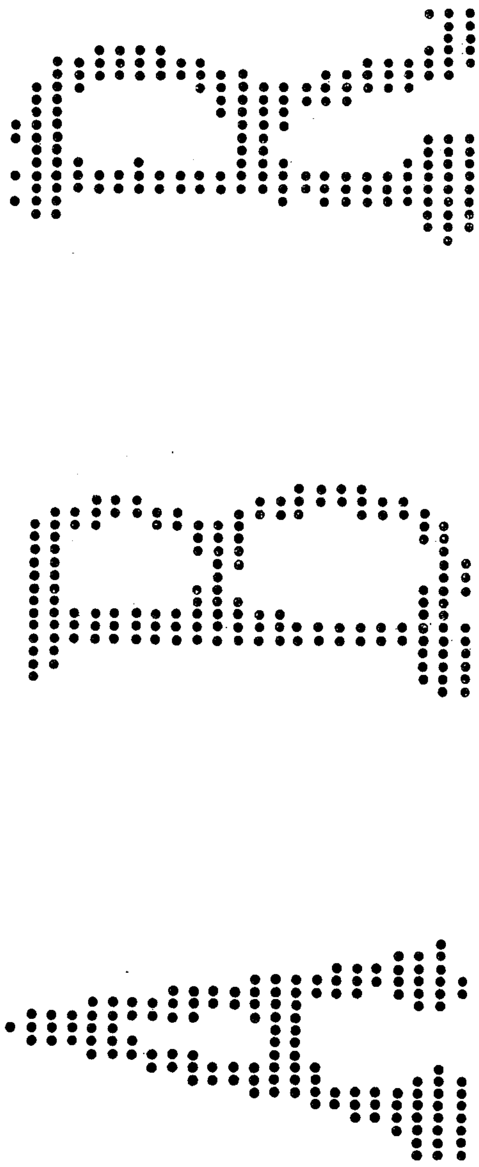
Figure 13B:
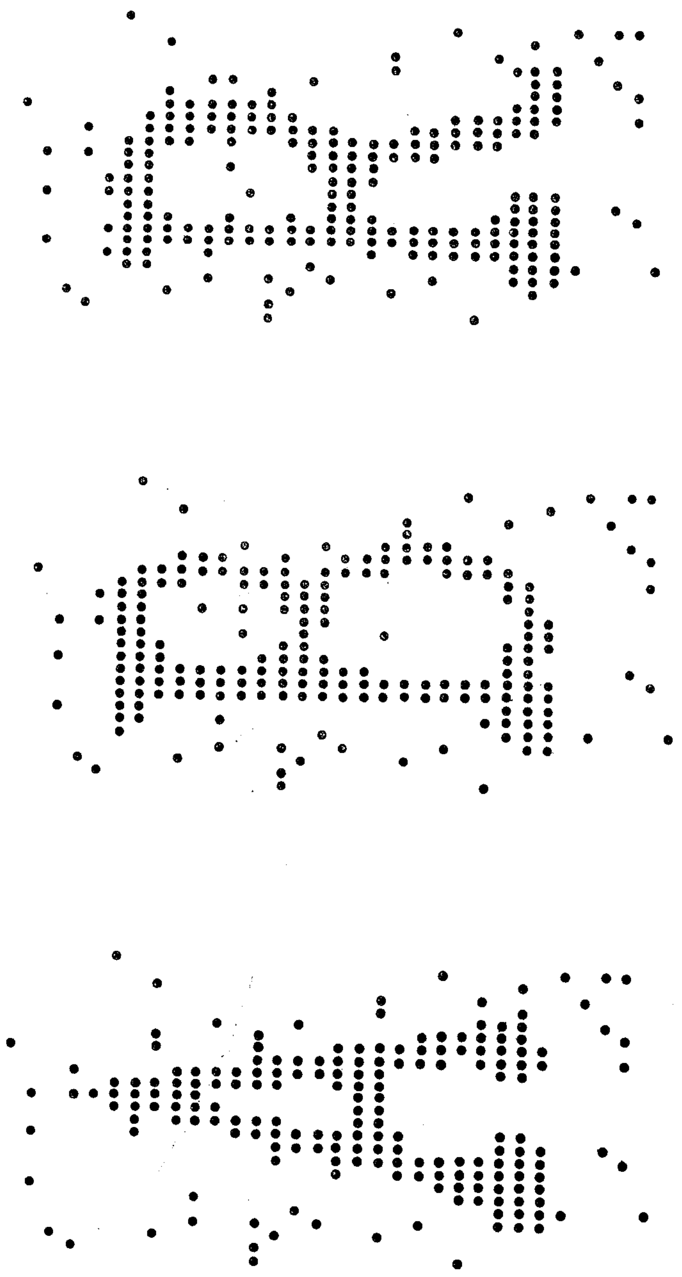
Figure 13C:
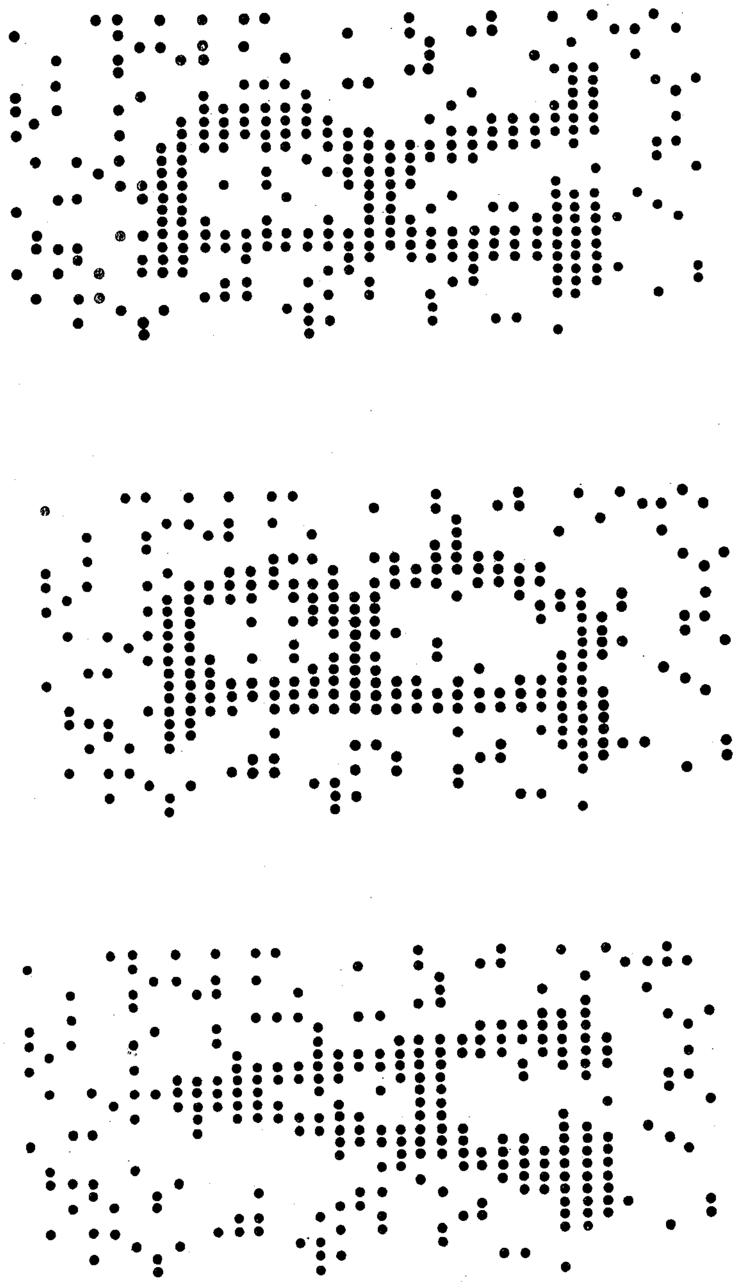

FIGURES 13*a*, 13*b*, and 13*c* compose a group of charts showing reference patterns and test patterns that were used to study the system stability and discrimination.

FIGURE 14 is a chart showing the stability and discrimination of the system in identifying the reference and test patterns shown in FIGURE 13.

Figure 25:
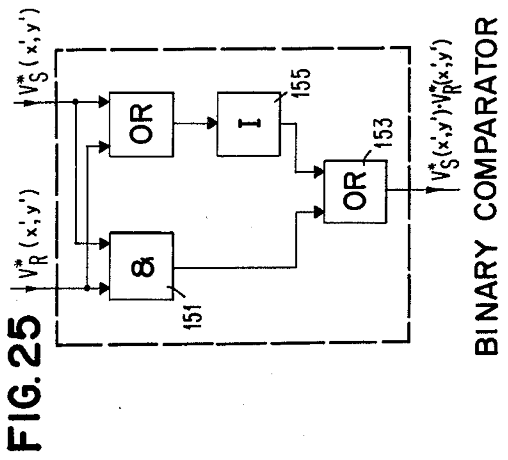
Figures 26, 26A:
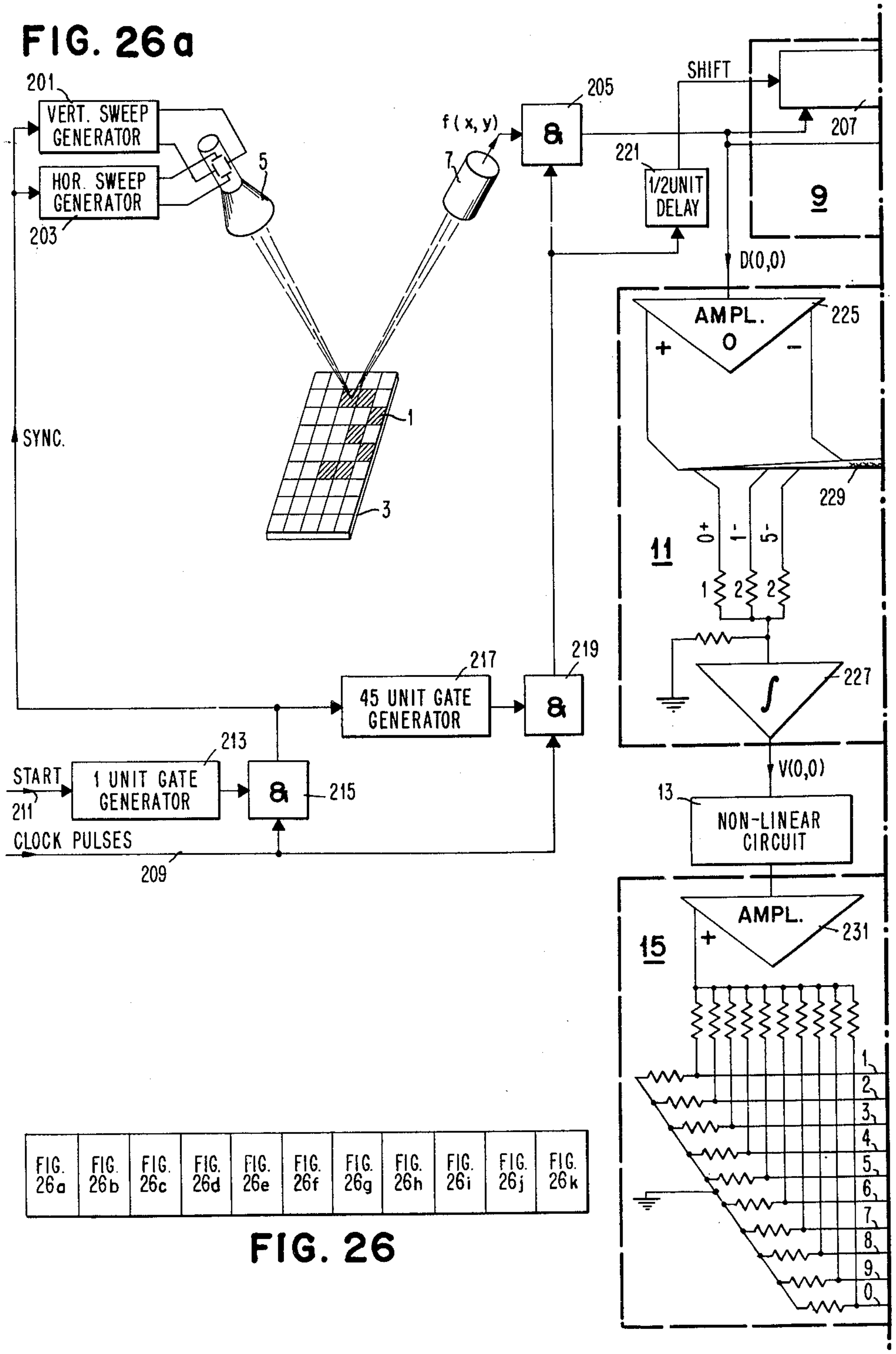
Figure 26B:
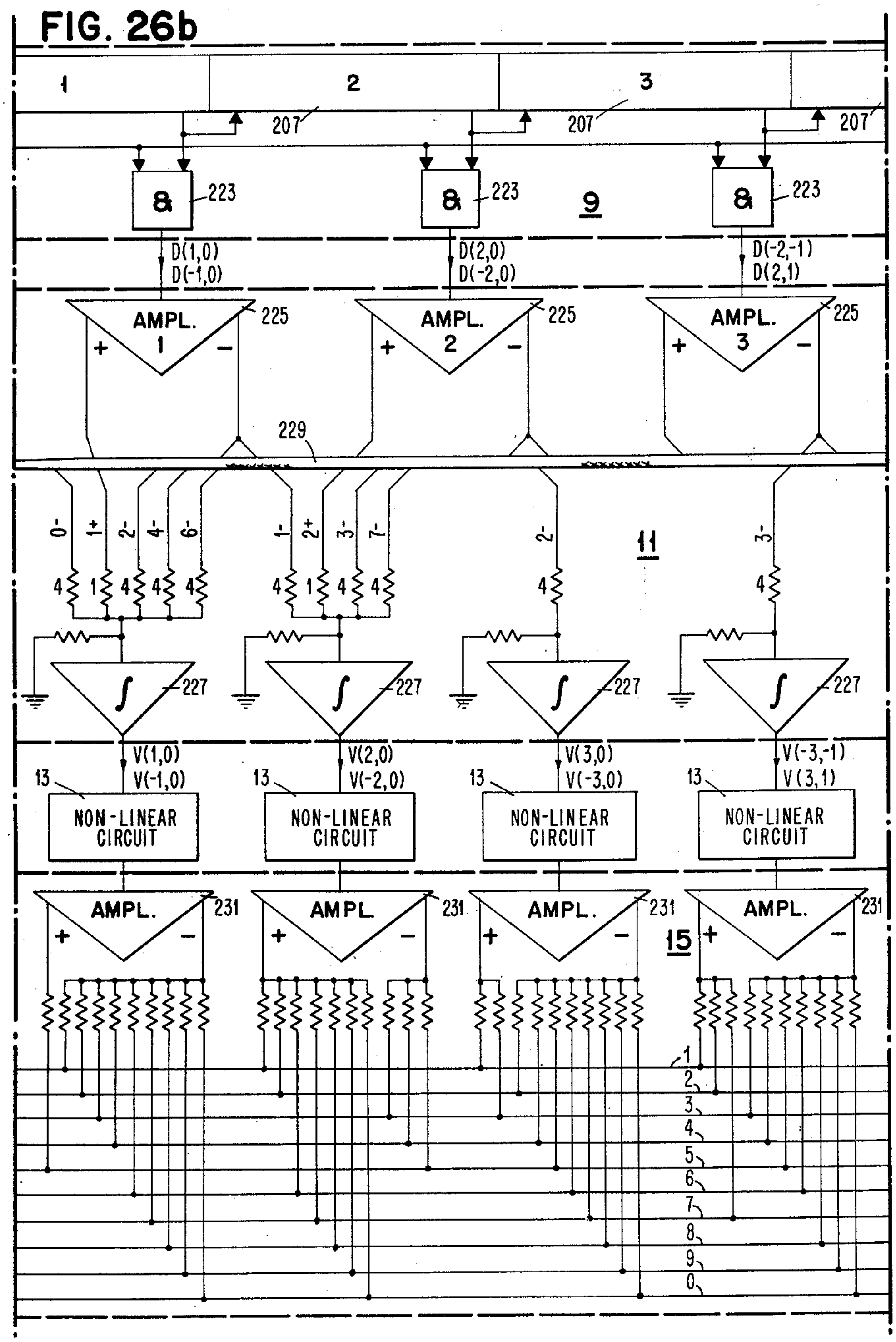
Figure 26C:
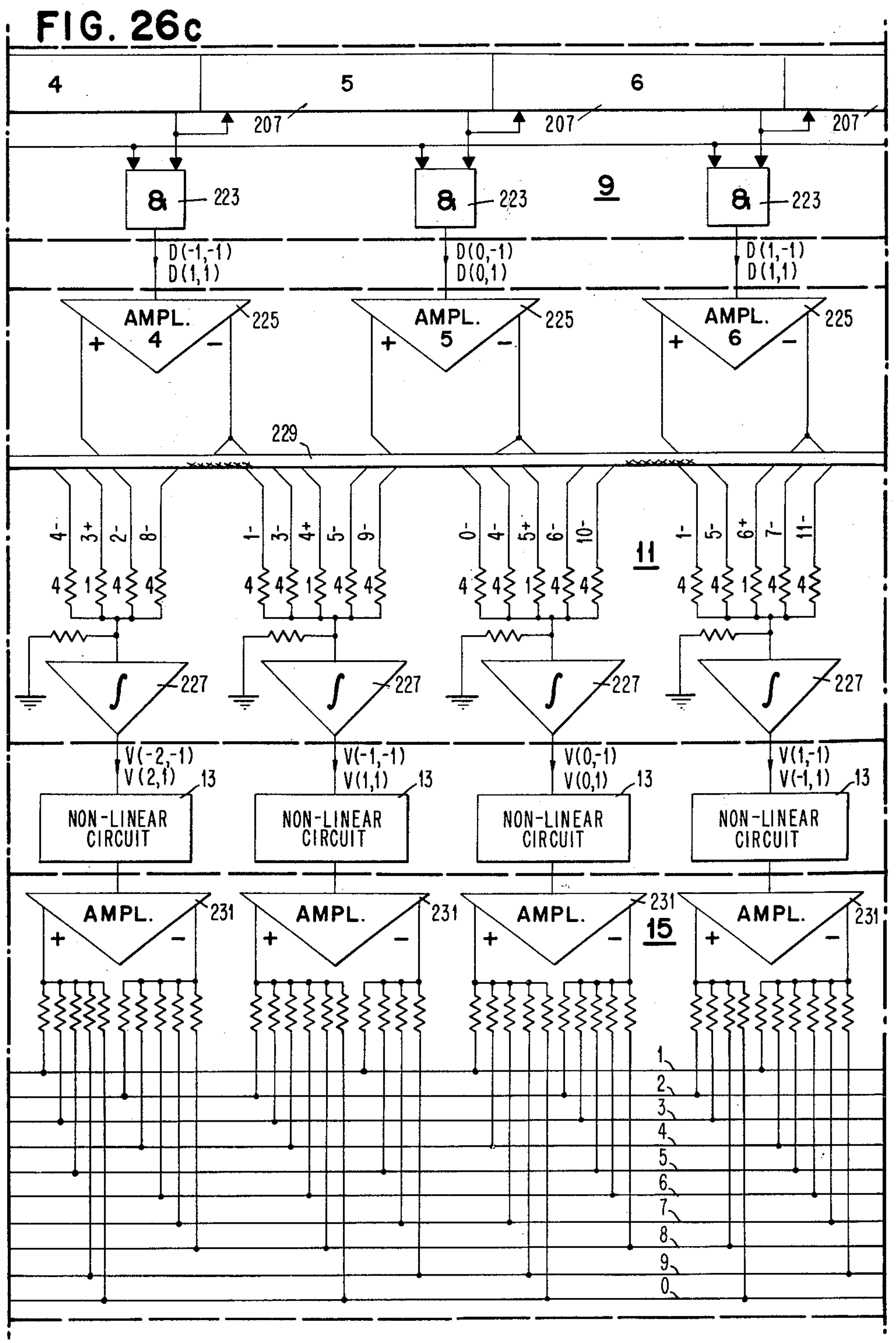
Figure 26D:
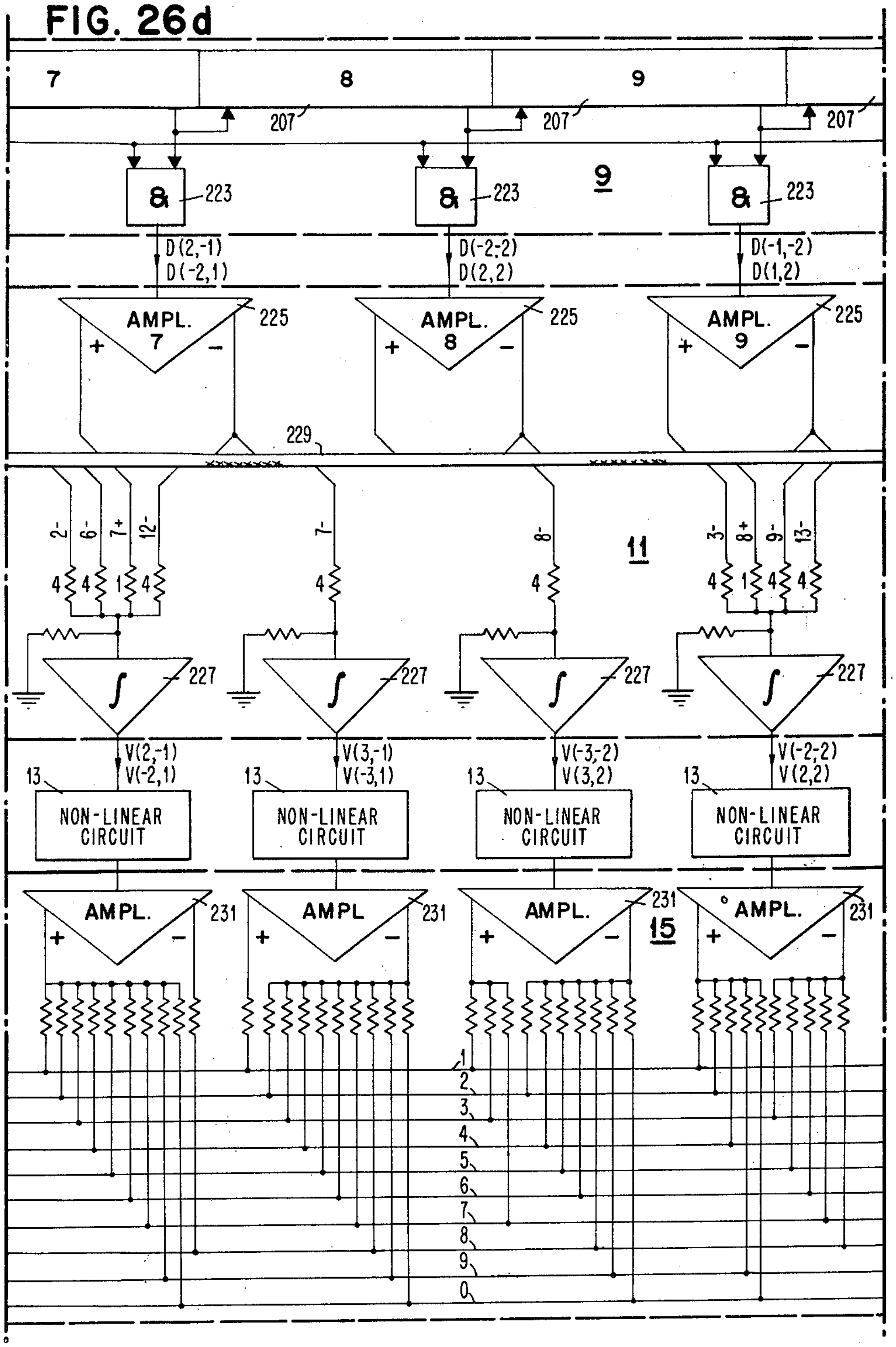
Figure 26E:
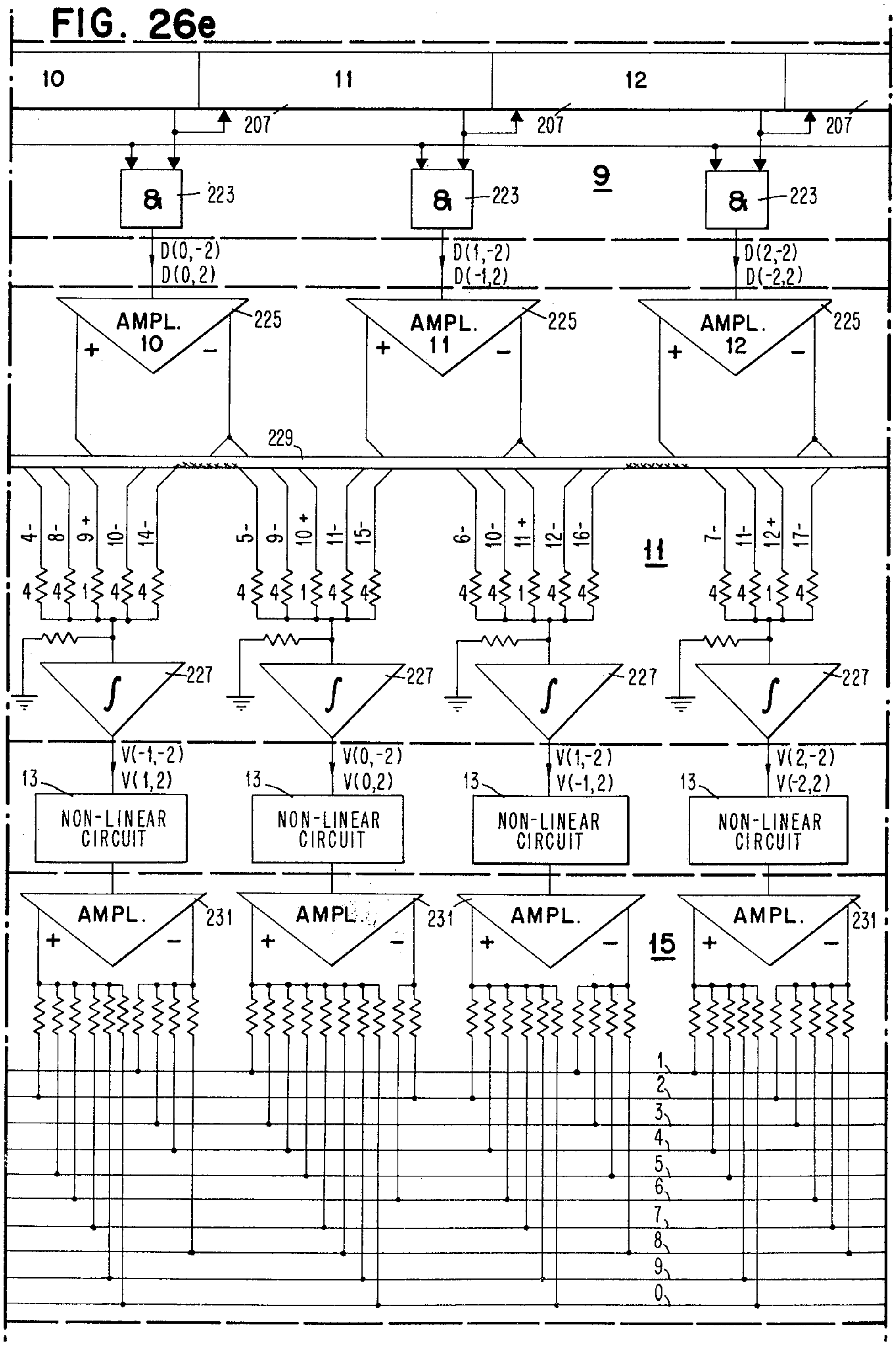
Figure 28:
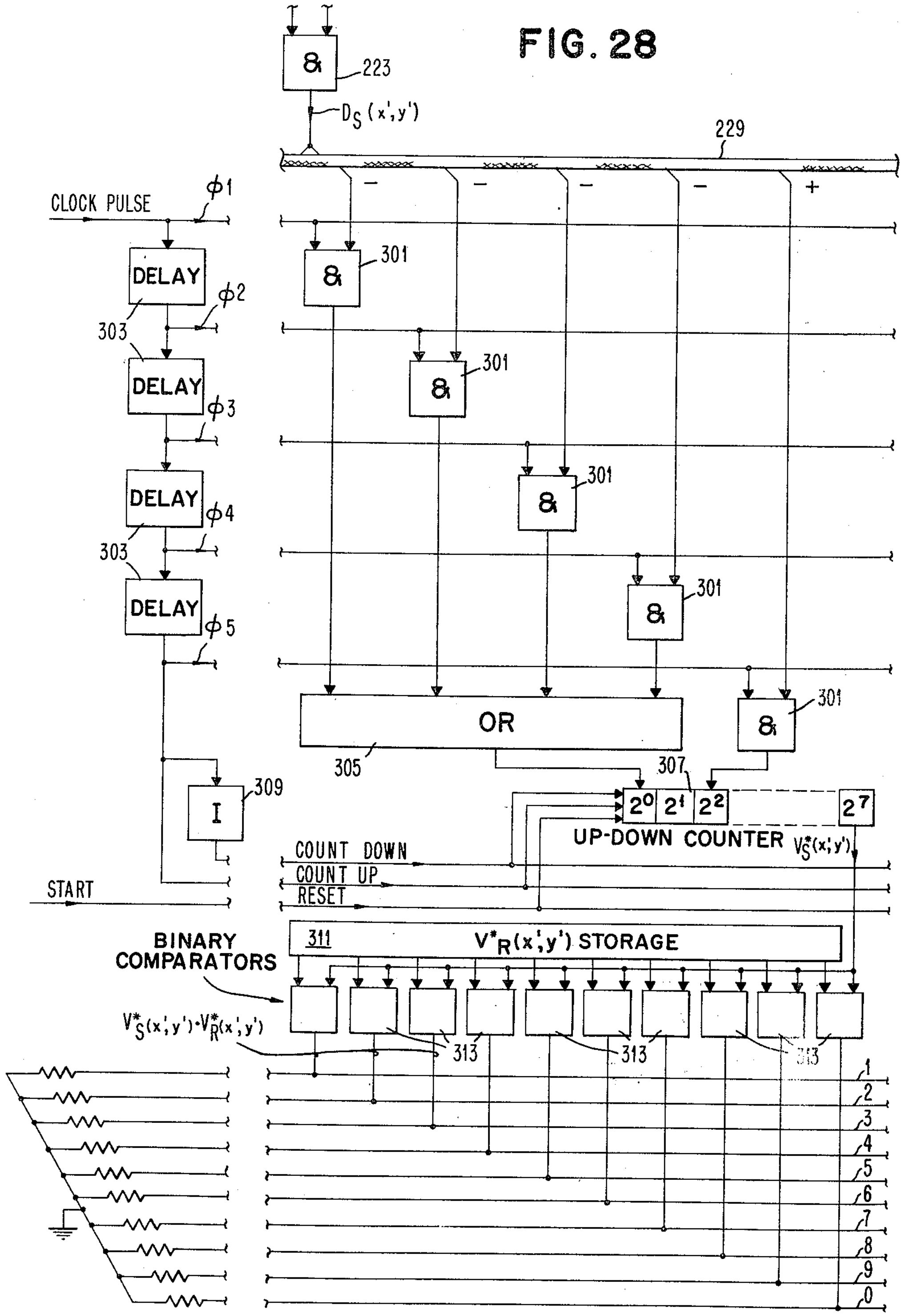

FIGURES 15 through 25 are diagrams showing the basic digital symbols and units used in FIGURES 26 and 28.

FIGURE 26 shows the relationship of FIGURES 26*a* through 26*k*.

Figure 1:
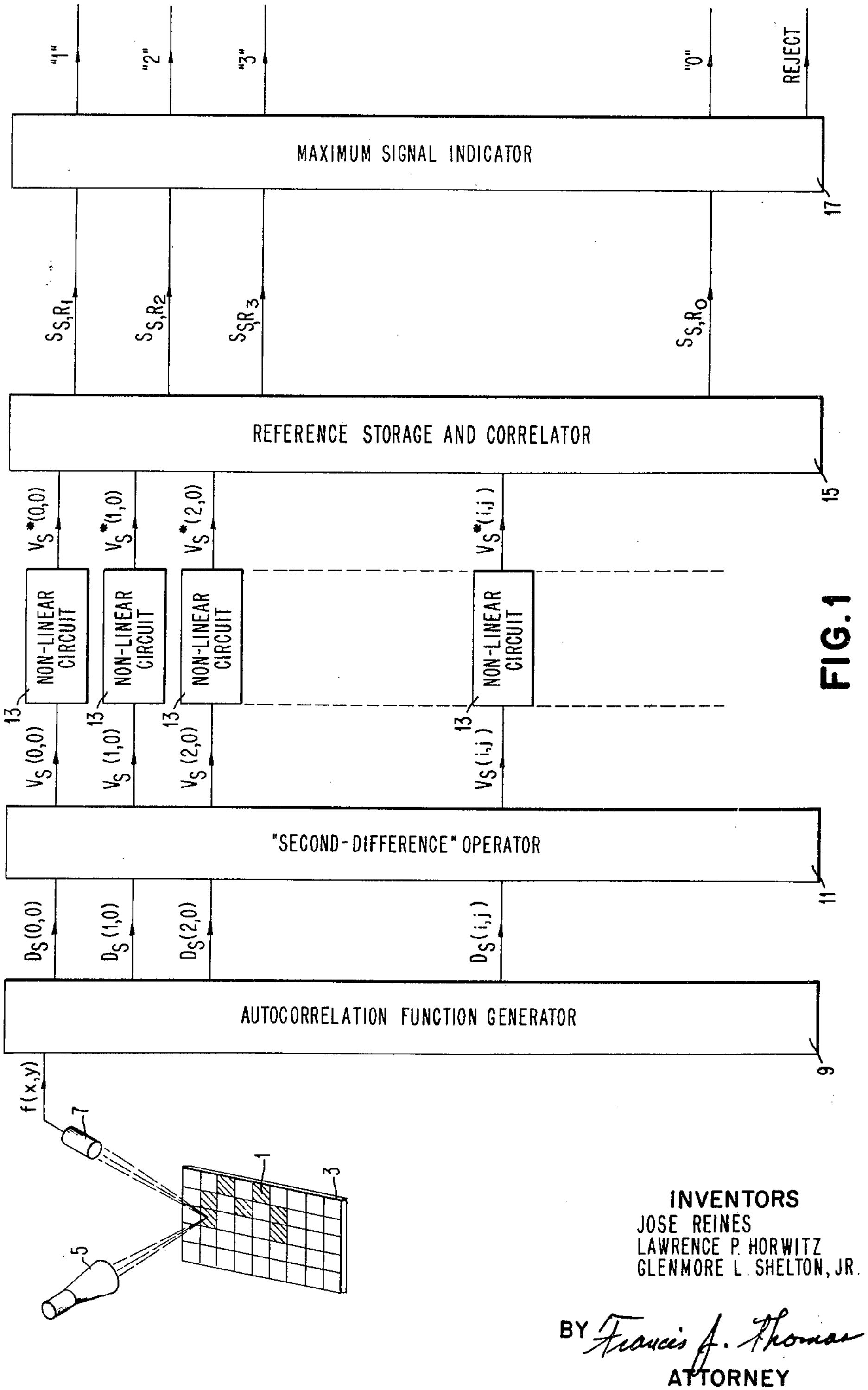
FIGURE 1 is a block diagram of a specimen identification apparatus utilizing comparison of non-linearly weighted functions of autocorrelation functions.

FIGURES 26*a* through 26*k* are schematic diagrams of the embodiment shown in FIGURE 1.

Figure 27:
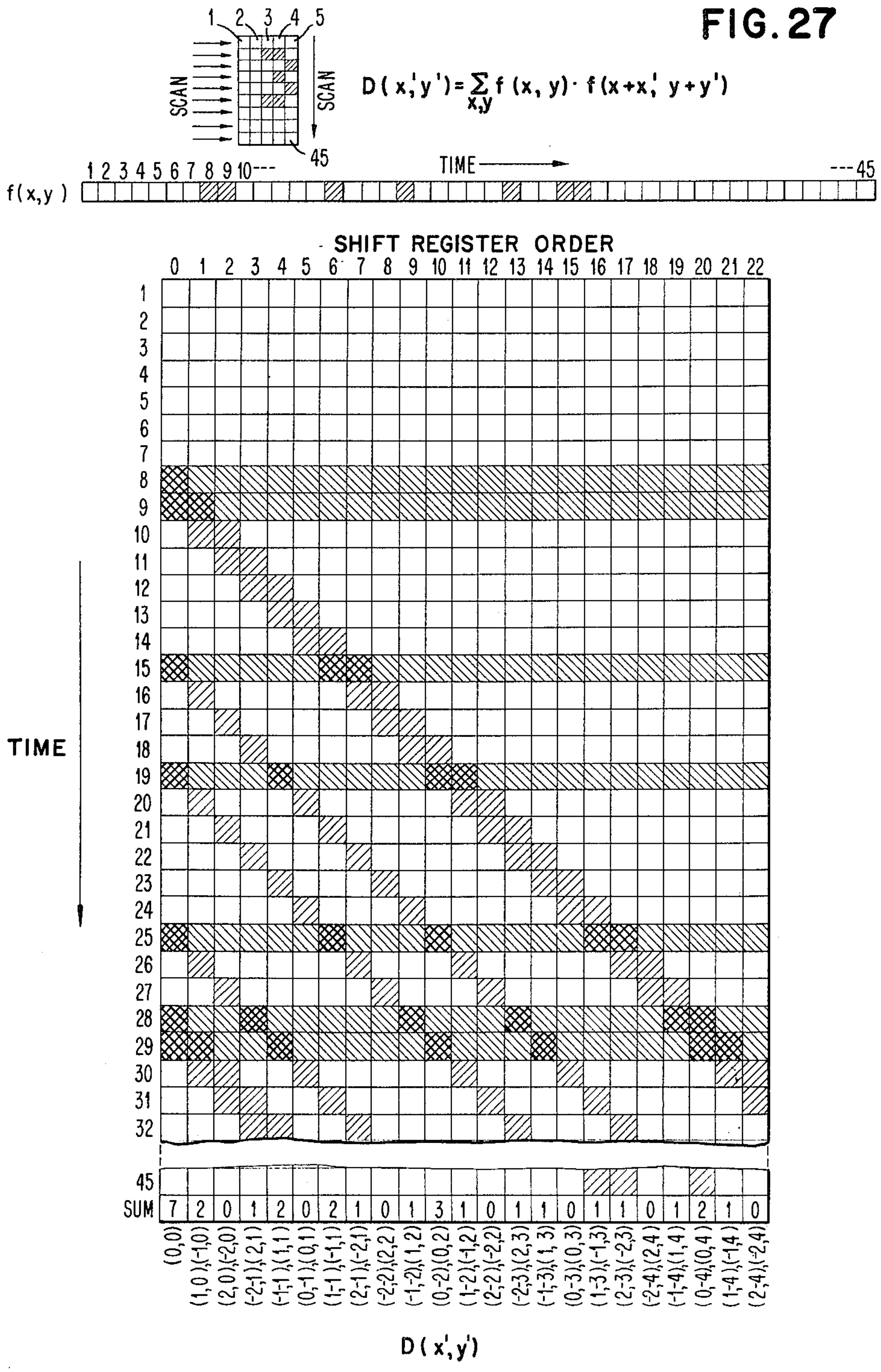

FIGURE 27 is a diagram showing the operation of the autocorrelation function generator used in the embodiments of FIGURES 26 and 27.

FIGURE 28 is a diagram of a digital circuit that can be used in substitution for a portion of the analog circuitry shown in FIGURE 26.

A block diagram of an embodiment of the invention is shown in FIGURE 1. A specimen 1 on a matrix 3 is scanned by a flying-spot scanner 5. A phototube 7 develops a signal indicative of the specimen. Any means for converting the specimen into electrical data may be used and the scanner and phototube illustrate on well-known means.

The autocorrelation function $D_S(x', y')$ of the specimen S is generated from the signal $f(x, y)$ by a function generator 9. A "second-difference" operator 11 generates the "second-difference" function $V_S(x', y')$ of the autocorrelation function which is applied to a group of non-linear circuits 13. These circuits generate the function (binary boundary function) $V_S^*(x', y')$, which is applied to a reference storage and correlator circuit 15 whose outputs represent the sums $S_{S,R}$. These sums are applied to a maximum signal indicator 17 which provides an indication of the identity of the specimen or a "reject" indication if the specimen is not similar to any one of the reference patterns.

In order to provide a clear illustration of the principles of the invention which are embodied in the accompanying detailed descriptions, the manual generation of autocorrelation functions and "second-difference" functions of the autocorrelation functions are described below.

Since the autocorrelation function of a specimen is a measure of the correlation of the specimen with itself, it may be generated by comparing the specimen to be autocorrelated with itself, shifted in all directions and over all distances.

Figures 2, 3, 4, 5, 6, 7, 8, 9, 10:
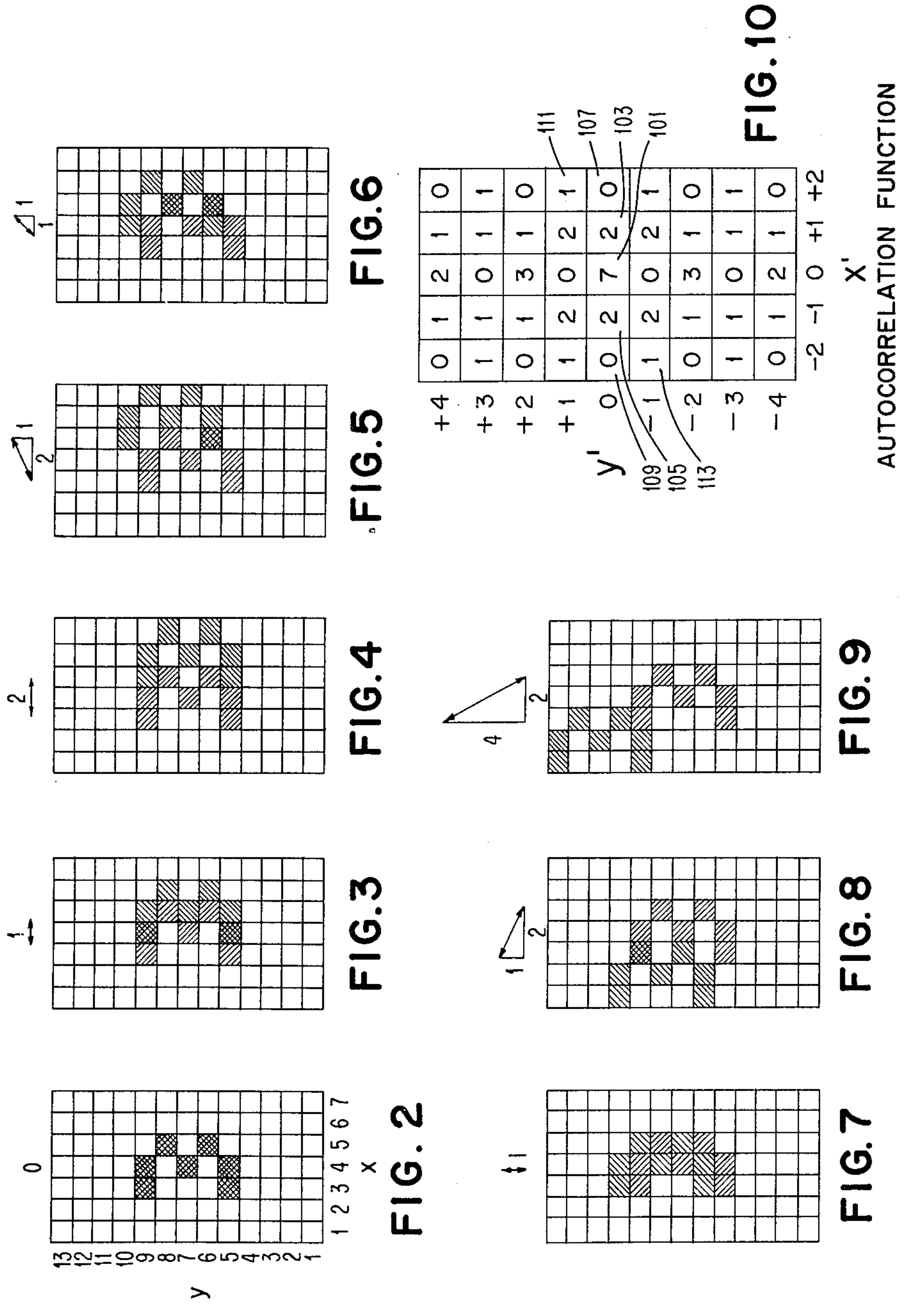
FIGURES 2 through 9 are a set of explanatory diagrams showing a procedure for generating the autocorrelation function of a typical pattern.
FIGURE 10 is a chart showing the autocorrelation function generated following the procedure in FIGURES 3 through 9.

FIGURES 2 through 9 illustrate a method of generating the autocorrelation function shown in FIGURE 10 for a typical pattern "3." The pattern is comprised of 15 discrete areas on a 3 x 5 matrix for simplicity of arithmetic. In practice, this invention is designed to be used to identify specimens comprising many discrete areas on a large matrix.

The pattern "3" formed by slant-left lines is common to FIGURES 2 through 9; the pattern formed by slant-right lines is shifted to various positions in the figures. FIGURE 2 illustrates the "0-shift" pattern, and hence, the slant-left and slant-right patterns are superimposed. If the discrete areas of the matrix are considered to have $x$ and $y$ coordinates as shown in FIGURE 2, $f(x, y)$ is "1" for $(x=3, y=9)$; $(x=4, y=9)$; $(x=5, y=8)$; $(x=4, y=7)$; $(x=5, y=6)$; $(x=4, y=5)$; and $(x=3, y=5)$. For all other values of $x$ and $y$, $f(x, y)=0$. The autocorrelation function $D(x', y')$ is determined by the equation:

$$D(x', y')=\sum_{x,y} f(x, y)f(x+x', y+y')$$

In the "0-shift" condition (FIGURE 2), $x'=y'=0$ and the sum is merely a count of the number of areas that are filled by the pattern, as the product $$f(x, y)f(x+0, y+0)=1$$

whenever $f(x, y)=1$. This sum is "7" for the pattern in FIGURE 2, and it is placed in the "0-shift" position 101 in the table in FIGURE 10. FIGURE 3 illustrates the conditions present for a shift of one unit to the right, (designated as $x'=1$, $y'=0$), which causes a "2" to be placed at the corresponding position 103 of the table in FIGURE 10 as there are two coincident areas on the matrix. Position 103 is displaced one unit to the right of position 101 $(x'=1, y'=0)$ to correspond to a shift of one unit to the right of the pattern in FIGURE 3. A "2" is also placed in position 105 of the table as a shift to the left of one unit $(x'=-1, y'=0)$ obviously produces the same result as a shift to the right of one unit $(x'=1, y'=0)$. In a similar manner, positions 111 and 113 of the table are filled with "1's" as determined by FIGURE 5. FIGURES 6 through 9 illustrate the conditions present for several other combinations of $x'$ and $y'$. Using this procedure the entire autocorrelation table of FIGURE 10 may be filled in for the typical pattern "3."

Figure 11:
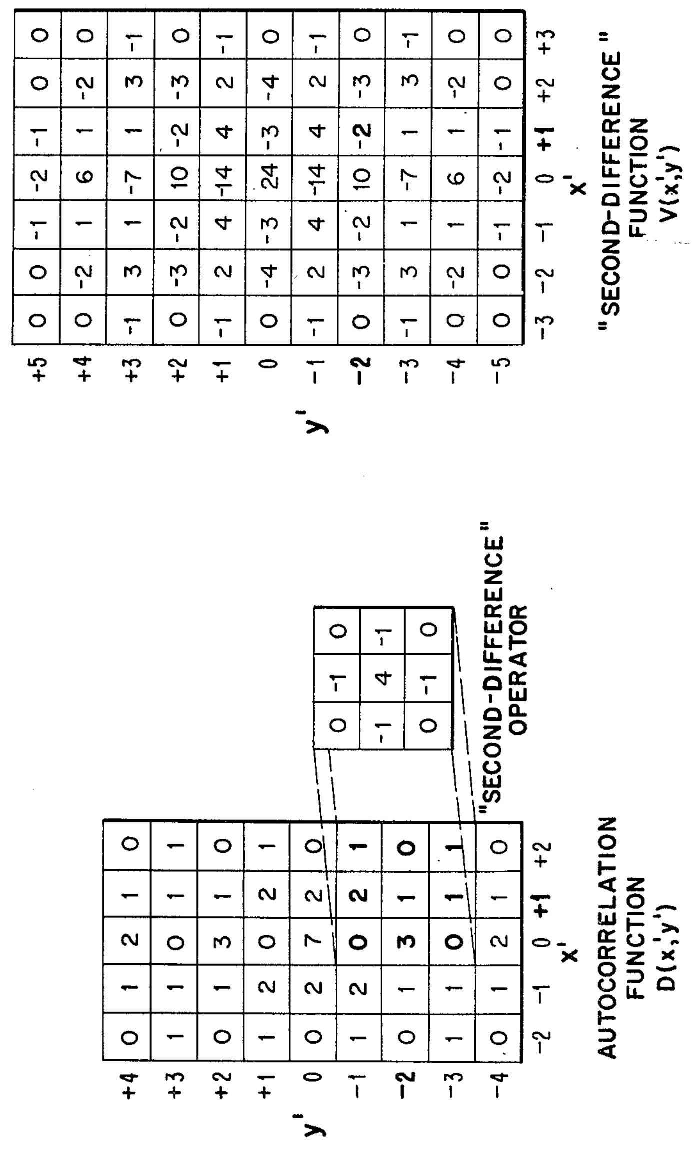
FIGURE 11 is a chart illustrating the generation of the "second-difference" function of the autocorrelation function.

The diagrams in FIGURE 11 illustrate a method of generating the "second-difference" function $V(x', y')$. The value of each point of this function is computed point-by-point by multiplying the operator matrix and a portion of the autocorrelation function matrix and then summing the products. In the example illustrated, the operator matrix is centered around the point $$(x'=+1, y'=-2)$$

of the autocorrelation function matrix. The multiplications provide products as follows:

$$(4)(1)-(1)(2)-(1)(3)-(1)(0)-(1)(1)=2$$

This result appears in the "second-difference" function matrix at location $(x'=+1, y'=-2)$. The remainder of the matrix may be calculated by shifting the operator matrix to the corresponding positions and performing similar arithmetic.

It may be noted that both the autocorrelation function matrix and the "second-difference" function matrix contain symmetry about their center points.

FIGURE 12 shows ten arabic numeral patterns on 3 x 5 matrices; their autocorrelation functions; the "second-difference" functions of their autocorrelation functions; and binary non-linear functions of the "second-difference" functions. All functions are shown in abbreviated form, omitting the redundant "reflected" portions.

The binary non-linear functions $V_R^*(x', y')$ are generated by replacing all positive and zero values of the "second-difference" function with +1 and all negative values with −1.

The normalization factors that are ordinarily required for comparison techniques of this type have been defined as:

$$\left[\sum_{x',y'} V_R^{*2}(x', y')\right]^{1/2}$$

Since $V_R^*(x', y')$ *is* +1 or −1 for all values of $x'$, $y'$; $V_R^{*2}(x', y')$ is always +1 and the quantity $$\left[\sum_{x',y'} V_R^{*2}(x', y')\right]^{2}$$

is dependent only upon the number of elements in the function $V_R^*(x', y')$. Since this is obviously equal for all reference patterns, normalization is unnecessary in the preferred embodiments.

Autocorrelation function comparison provides accurate and stable identification of specimens. Further accuracy and stability of identification are achieved by use of a discriminating function such as the "second-difference" function. The system performance is still further enhanced by certain non-linear functions of these functions. An example of the accuracy and stability of identification is based on the reference and test patterns shown in FIGURE 13. The patterns A, B and R are used because of their similarity in structure to show the system performance under adverse conditions. Two groups of test patterns are illustrated. The group 1 test patterns are generated by the random addition of fifty noise bits; the group 2 test patterns include 150 noise bits.

The correlation table in FIGURE 14 shows the stability of system performance in identifying the reference and test patterns using autocorrelation function $D(x', y')$ comparison, "second-difference" function $V(x', y')$ comparison and two types of non-linear function $V^*(x', y')$ comparison. In addition to the binary non-linear function correlation results, tertiary (three level) non-linear function results are shown where the particular tertiary function is obtained by considering "second-difference" function zero values separately instead of combining them with the positive values as was done in generating the binary function. The results have been normalized so that an ideal input specimen (reference pattern input) provides an identification factor of "1." Note that the ideal patterns and all test patterns are correctly identified using both $V^*(x', y')$ modes of comparison as well as $V(x', y')$ comparison, but that the binary mode provides good discrimination within a relatively low dynamic range of values. The ideal patterns and group 1 test patterns are correctly identified by all comparison techniques, while the group 2 test patterns A and B are incorrectly identified using $D(x', y')$ comparison.

The schematic diagrams (FIGURES 26 and 28) of the embodiments to be described below include several symbols and circuits which are now explained in detail with respect to FIGURES 15 through 25.

R. K. Richards, Digital Computer Components and Circuits, 1957, published by Van Nostrand, provides a basic introduction to digital circuits and schematic diagrams of circuits that could be used in this invention.

Binary digital circuits operate on signals that are generally defined as "1" and "0." These indications are merely representative of the two numerical digits in the binary number system. The circuits may represent these two indications with any pair of voltages, such as +V and 0; +V and −V; 0 and −V; etc. The binary non-linear functions shown in FIGURE 12 were considered to have values of +1 or −1, which correspond exactly to the values 1 and 0 in the binary number system. The values +1 and −1 are chosen to avoid the necessity of normalizing as the normalization factor (square root of the sum of the squares of the values, as described shown) is equal for all reference patterns because the square of both +1 and −1 equals +1.

Figure 15:
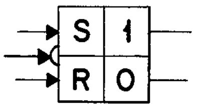

FIGURE 15 shows a basic bistable circuit, which is referred to as a flip-flop. The flip-flop is set by applying a signal to the set (S) input. This provides a signal at its "1" output. This circuit is reset by applying a signal to the reset (R) input which provides a signal at the "0" output. There is no effect on the circuit if an "S" input is applied when a circuit is already set, or if an "R" input is applied when previously reset. A "toggle" input is also applied to the circuit, to both the set and reset inputs. This input reverses the condition of the circuit regardless of its prior condition.

Figure 16:
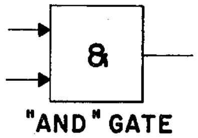
Figure 17:

An "and" gate, as shown in FIGURE 16 provides an output if all inputs receive signals at the same time. A delay circuit is shown in FIGURE 17. Signals applied to this circuit are passed after a period of time without being affected in shape or amplitude.

Figure 18:
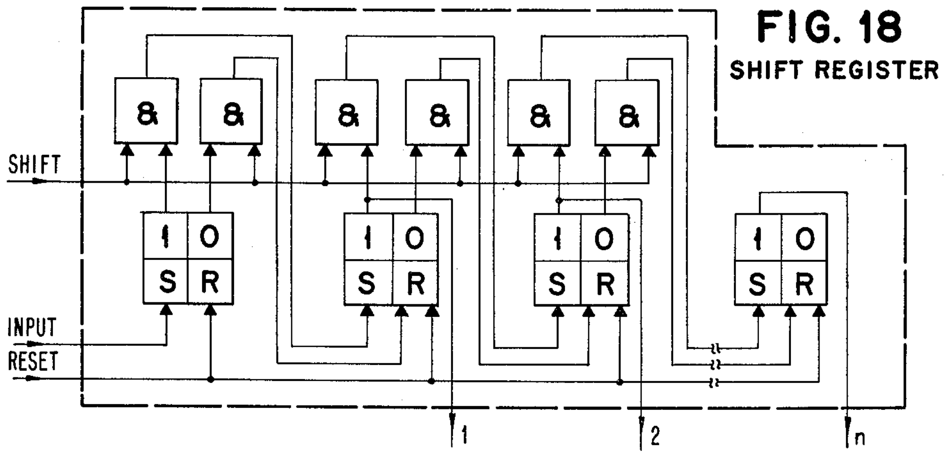

A shift register is shown in FIGURE 18. This register is comprised of a group of shift register "sections" in tandem. A text authored by R. K. Richards, 1955, D. Van Nostrand Co., entitled Arithmetic Operations in Digital Computers contains an explanation of these and other shift register sections on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest-order flip-flop. Outputs are provided to indicate the data in the various orders of the register.

Figure 19:
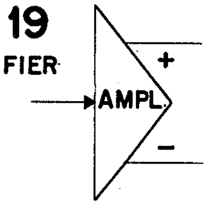

An amplifier having two outputs is shown in FIGURE 19. This circuit provides an amplified representation of its input at the "+" output and an amplified and inverted representation of its input at the "−" output. This circuit can be readily constructed in many ways, as for example, from two cascaded inverting D.C. amplifiers, the first with the desired amplification factor and the second with an amplification factor of one. The first amplifier thus provides the inverted (−) output and the second amplifier provides the non-inverted (+) output.

Figure 20:
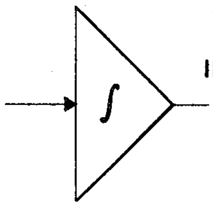

A non-inverting analog integrator is shown in FIGURE 20. This circuit can be constructed by cascading a conventional inverting integrator and an inverter (D.C. amplifier).

Figure 21:
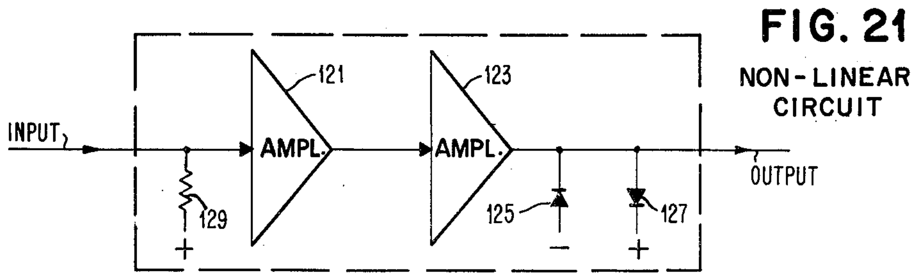

A binary non-linear circuit is shown in FIGURE 21. This circuit which is also referred to as a "threshold circuit," is designed to provide a binary output whose two conditions are represented by a positive voltage level (+1) or a negative voltage level (−1). Two high-gain inverting D.C. amplifiers 121 and 123 are cascaded and their output is limited by diodes 125 and 127. When no input signal is applied amplifier 121 generates a negative output (due to the positive bias applied through a resistor 129) which is inverted again by amplifier 123 to produce a positive output signal whose amplitude is limited by diode 127. The circuit operates in the same manner when a positive input signal is applied. A negative signal, however, overcomes the positive bias to amplifier 121 causing it to generate a positive output which is inverted and limited by amplifier 183 and diode 185 to produce a negative output signal. Thus, the output signal is connected into a binary signal which assumes the value +1 when the input is positive or zero and the value −1 when the input is negative.

Figure 22:
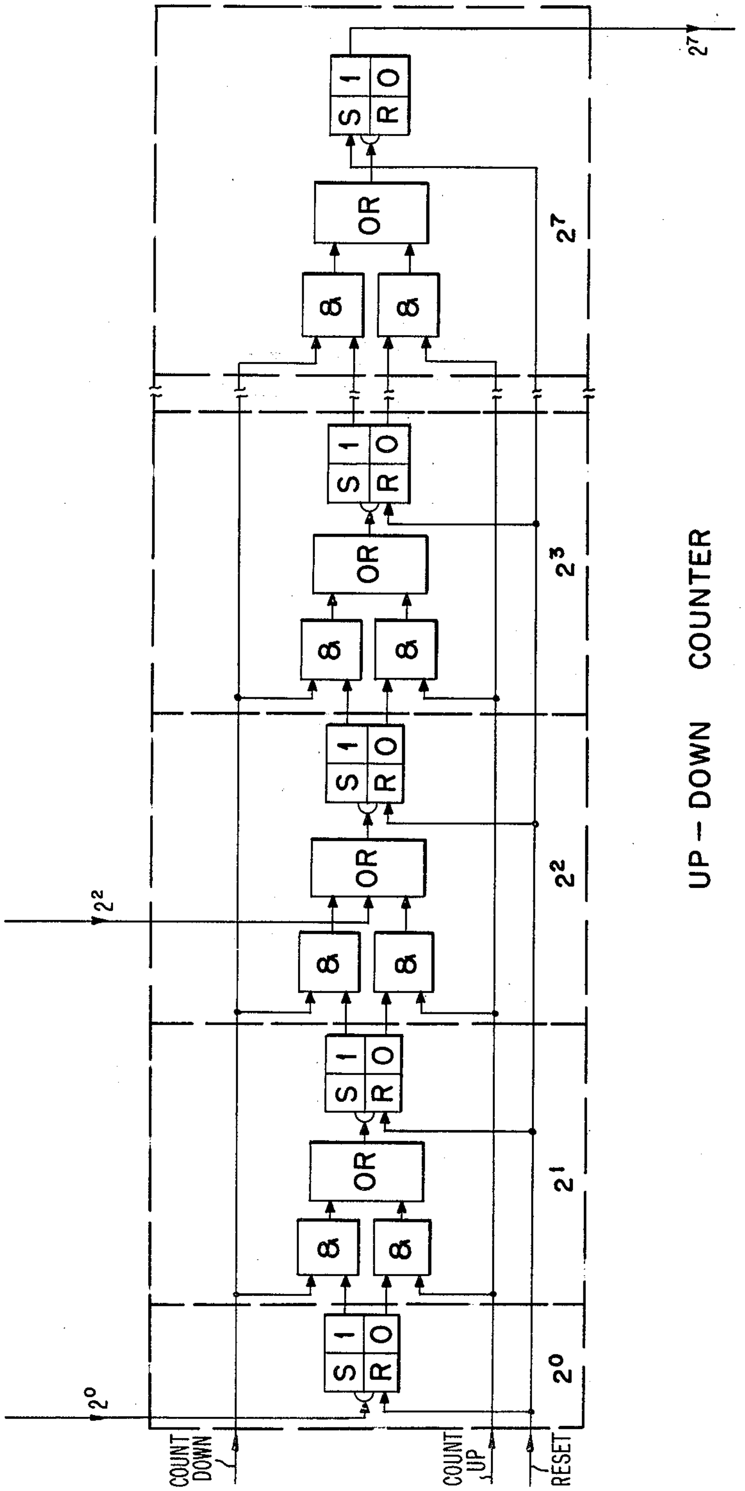

A type of up-down counter is shown in FIGURE 22. This counter is designed to count above and below a center value. Since the counter is shown to contain seven stages, it is capable of counting to $2^7-1$(127). The center value of 64 is established by resetting the counter to 1,000,000 prior to use (which is accomplished by applying the reset input signal to the reset input of all flip-flops except the highest-order ($2^7$) flip-flop, where the reset signal is applied to the set input of this flip-flop. This circuit is especially adapted to also perform the "second-difference" and non-linear operations required in the invention (as will be described in detail below) as it contains the customary $2^0(1)$ input as well as a $2^2(4)$ input (directly to the $2^2$ section of the counter) to permit these signals to be weighted four times more than the $2^0$ input signals. The highest-order flip-flop provides the only circuit output that is used in the invention. This output represents the binary digit 1 when the counter contains a number equal to or greater than the center value (64), and the digit 0 when the counter contains a number less than this value. The count direction is controlled by the count down and count up input signals. When the count up signal is present, carry signals are propagated to the next higher stage as each flip-flop output changes from 1 to a 0. The count down signal is applied when the counter is to subtract the input signals from the total and, thus, the carry signals are propagated when the flip-flop outputs change from a 0 to a 1.

Figure 23:
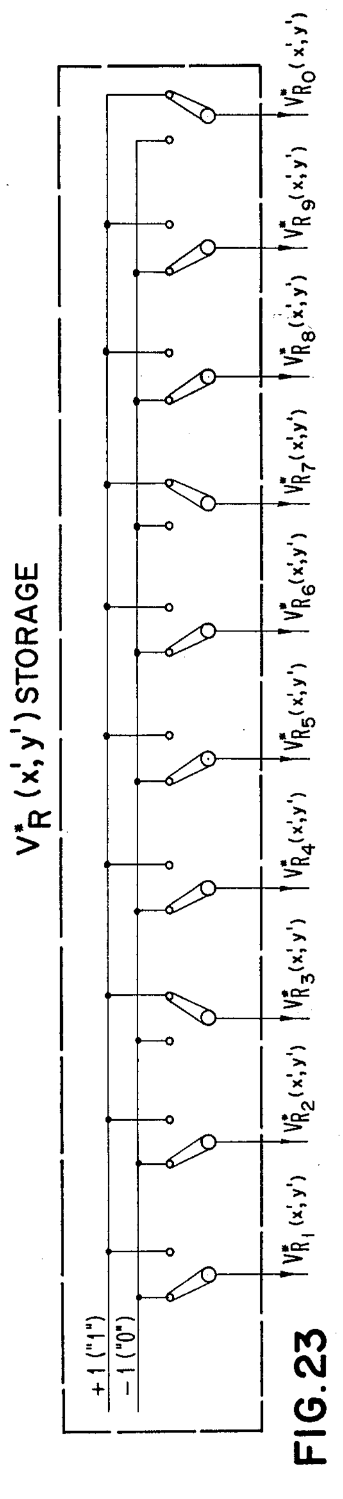

The binary storage circuit shown in FIGURE 23 comprises a group of switches which can be operated to place a binary signal on each output lead. This circuit is to be used to store the non-linear reference functions $V_R^*(x', y')$ (which assume the binary values +1 and −1) shown in FIGURE 12.

Figure 24:
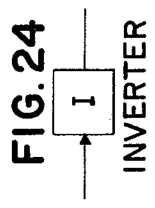

An inverter is shown in FIGURE 24 to be represented by a block labelled "I." Thic circut provides a binary output signal that is opposite to the applied input signal. That is, a 1 signal is generated when a 0 signal is applied and a 0 signal is generated when a 1 signal is applied.

A binary comparator is shown in FIGURE 25. This circuit generates one binary output when both inputs are of the same value and the opposite output when the inputs are different. This function is also known as an "inverted exclusive-or." When both inputs represent the binary value 1, an "and" gate 151 provides a 1 signal which is passed by an "or" gate 153 to the output lead. When both inputs represent the value 0, an inverter 155 the same value, no signal is applied to the "or" gate 153 to the output lead. When the input signals are not of the same value, no signal is applied to the "or" gate 153 and a signal representing the value 0 is present in the output lead. The output signal from the circuit is a positive voltage level when a 1 is represented and a negative level when a 0 is represented.

The specimen identification system embodied in the block diagram of FIGURE 1 is shown in detail in FIGURE 26. Common reference numerals are used wherever possible.

A three-by-five specimen 1 to be identified is located on a five-by-nine matrix 3. A flying-spot scanner 5 scans the matrix under the control of a vertical sweep generator 201 and a horizontal sweep generator 203. A signal indicative of the specimen is developed by a phototube 7 and passed by an "and" gate 205 to the lowest-order of a shift register 207 in an autocorrelation function generator 9. The system is synchronized by clock pulses applied on a lead 209. A start signal on a lead 211 is applied to a 1-unit gate generator 213 which develops a conditioning level to an "and" gate 215. The first clock pulse after the occurrence of the start signal is used to synchronize the sweep generators. This pulse is also applied to a 45-unit gate generator 217 which develops a conditioning level for an "and" gate 219. This gate passes the subsequent 45 clock pulses to "and" gate 205 to "sample" the phototube 7 output as the matrix areas are scanned. The output pulses from "and" gate 219 are also applied through a ½ unit delay 221 as "shift" pulses for the shift register 207. Thus, the matrix areas are serially scanned and the specimen data is applied to the shift register 207. The shift pulses from the ½ unit delay 221 cause the data to be sequentially transferred through the register toward the higher orders. The output of the "and" gate 205 is labelled D(0, 0) because the autocorrelation function sum for a zero displacement is merely the sum of the bits of the input function.

The autocorrelation function generator provides pulse train outputs which, if accumulated, would provide the appropriate autocorrelation function sums. The remaining autocorrelation function $D(x', y')$ sums are each serially generated by the action of the shift register 207 and a group of "and" gates 223.

The autocorrelation function sums were manually generated as described with respect to FIGURES 2 through 10, by shifting the specimen various amounts $(x', y')$ with respect to itself and checking for areas where the unshifted and shifted patterns coincided. The function may also be obtained by shifting vectors $(x', y')$ throughout the matrix (over all $x$, $y$) and checking for areas where both ends of the vectors coincide with areas of the specimen. This procedure is simulated in the embodiment shown in FIGURE 26. Each "and" gate 223 has two inputs: one input represents the undelayed specimen data from "and" gate 205; the second input represents the delayed (shifted) specimen data which is obtained from the appropriate shift register output. Thus, each "and" gate 223 provides an output pulse for each pair of specimen data bits that are displaced from each other by an amount which depends upon the "and" gate input connection to the shift register.

FIGURE 27 is a chart illustrating the operation of the autocorrelation function generator for a sample specimen. The matrix is scanned from left to right and from top to bottom as illustrated by the arrows, to generate a function $f(x, y)$. Time is considered to start at the beginning of the scan and is divided into 45 parts representing the 45 matrix areas. This function is applied to the first order of the shift register and, as shown in the chart by slant-right lines, progresses toward the higher orders, moving one order during each time interval. The first column of the chart, labelled the "0" order, is indicative of the input to the register, and the column, if summed, would provide "7" which is the autocorrelation function sum for a zero displacement. Slant-left lines are placed in those rows which contain a bit in the first (0-order) column. The chart areas that contain both slant-left and slant-right lines are indicative of the "and" gates 223 (FIGURE 26) that provide outputs at any given time. Since the last input bit occurs at time 29, there are no "and" gate outputs after this time and the chart is broken below this row. The columns are labelled at the bottom of the chart to coincide with the "and" gate output labels on FIGURE 26. Although the system does not accumulate the bits to form autocorrelation function sums, as such, the sums are indicated at the bottom of the chart and may be found to compare with the sums shown in FIGURE 12*a*. The system includes integrators in the "second-difference" operator circuit (to be discussed later) which serve the purpose of accumulation.

If an $m \times n$ specimen is to be identified, where $m$ is the specimen width, then a matrix that equals or exceeds $2m-1$ in width is necessary. If vertical scanning were utilized, the matrix height would have to equal or exceed $2n-1$. The remaining dimension need only be sufficient to contain the specimen. These minimum dimensions must be adhered to in order to maintain adequate blanks between lines for the simple, one-dimensional shift register technique of function generation to operate properly. If the matrix is made larger than the required minimum, additional shift register orders having useless outputs are needed.

The autocorrelation function generator 9 of the embodiment shown in FIGURE 26 produces only the non-redundant portion of the function. The entire function may be generated by using a shift register having a number of orders equal to one less than the number of matrix areas (44) and an equal number of "and" gates. In this case the common "and" gate input is taken from the last order of the first half of the register (22nd) order.

The "second-difference" operator has been shown to be the 3 x 3 matrix:

$$\begin{matrix} 0 & -1 & 0 \\ -1 & 4 & -1 \\ 0 & -1 & 0 \end{matrix}$$

The "second-difference" operator circuit 11 performs the required multiplications and summations as described with respect to FIGURE 11. A group of amplifiers 225 generate in-phase (+) outputs and out-of-phase (−) outputs which are applied through input resistor networks to non-inverting integrators 227. A cable 229 distributes the amplifier outputs to the appropriate integrator input resistors according to the labels on the leads connecting the resistors to the cable.

The following example of the operation of the "second-difference" operator circuit parallels the theoretical description with respect to FIGURE 11, and pertains to the generation of V(1, −2). The third integrator shown in FIGURE 22*e* generates the sum V(1, −2). As described with respect to FIGURE 11, this sum is comprised of:

$$4D(1,-2)-D(1,-1)-D(0,-2)-D(2,-2)-D(1,-3)$$

The integrator input resistor network contains 5 resistors of appropriate relative ohmic values to perform this operation. In order to provide a weight of "4" to the D(1, −2) input (from the + output of amplifier 11), the resistor that is shown connected to amplifier "11+" has a relative ohmic value of 1, whereas the remainder of the resistances have relative ohmic values of 4. Thus, the integrator 227 in the "second-difference" operator circuit 11 provides the output V(1, −2), (which is equal to V(−1, 2) due to the symmetry of the autocorrelation function) by weighting and summing the appropriate autocorrelation function outputs.

Figure 26F:
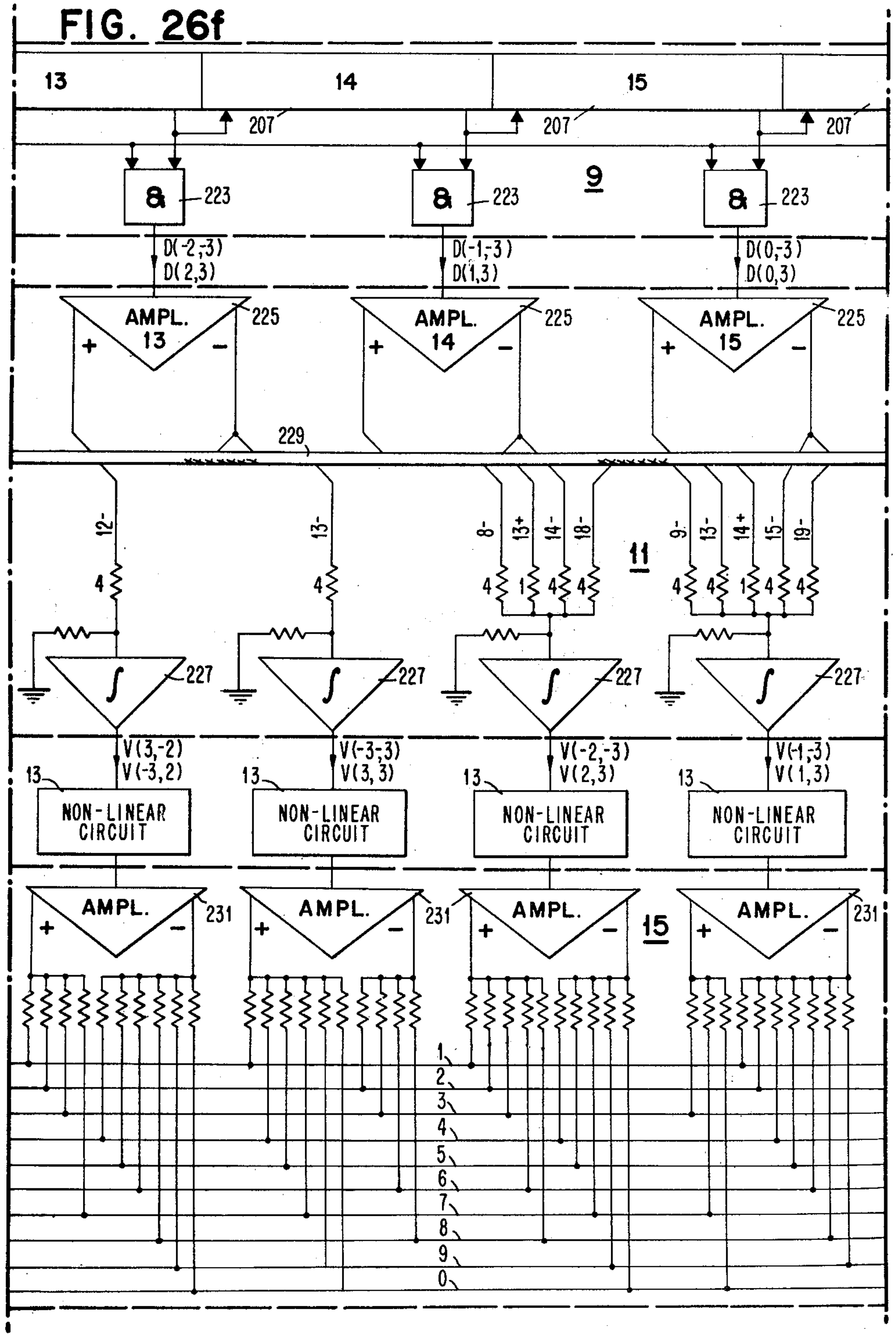
Figure 26G:
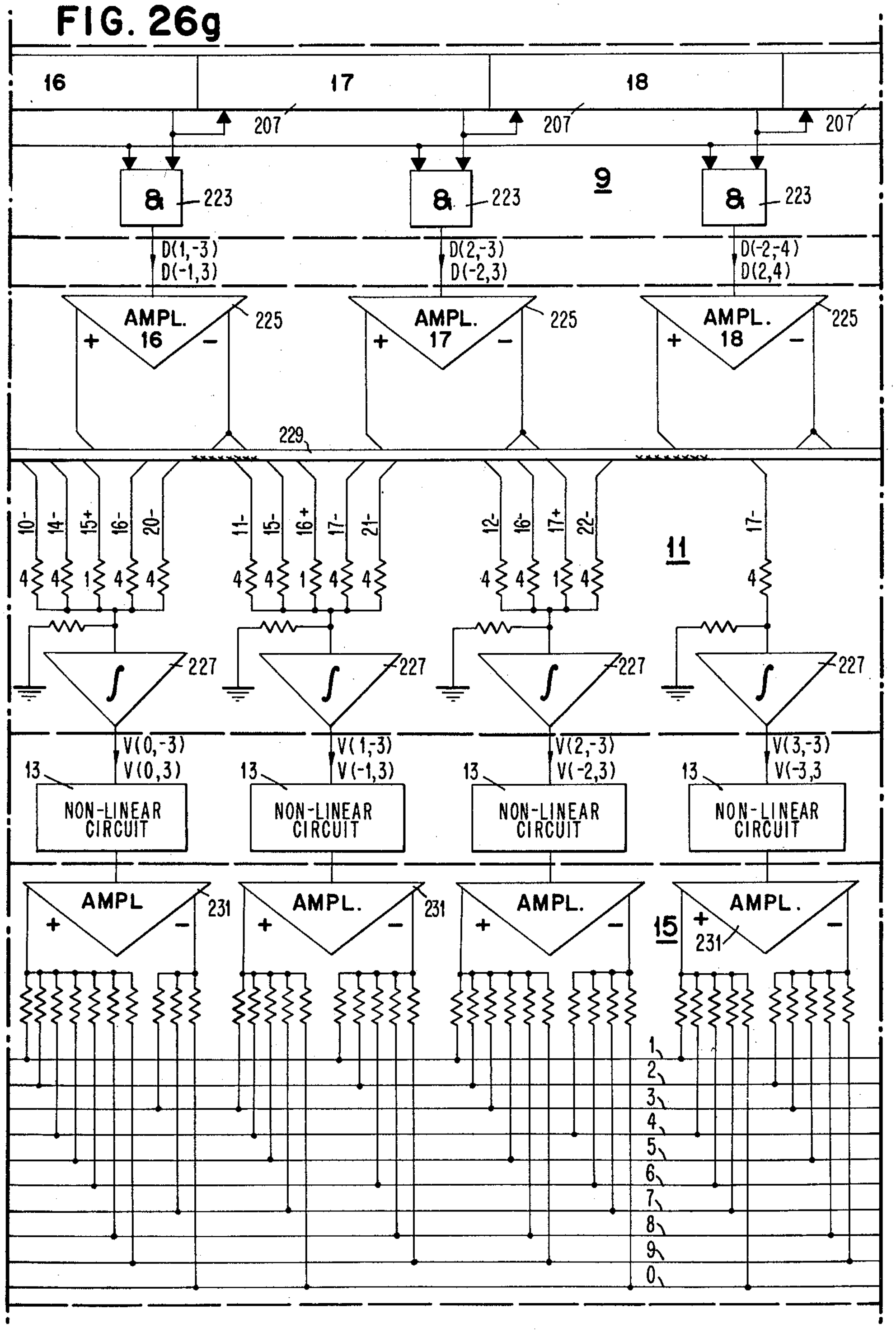
Figure 26H:
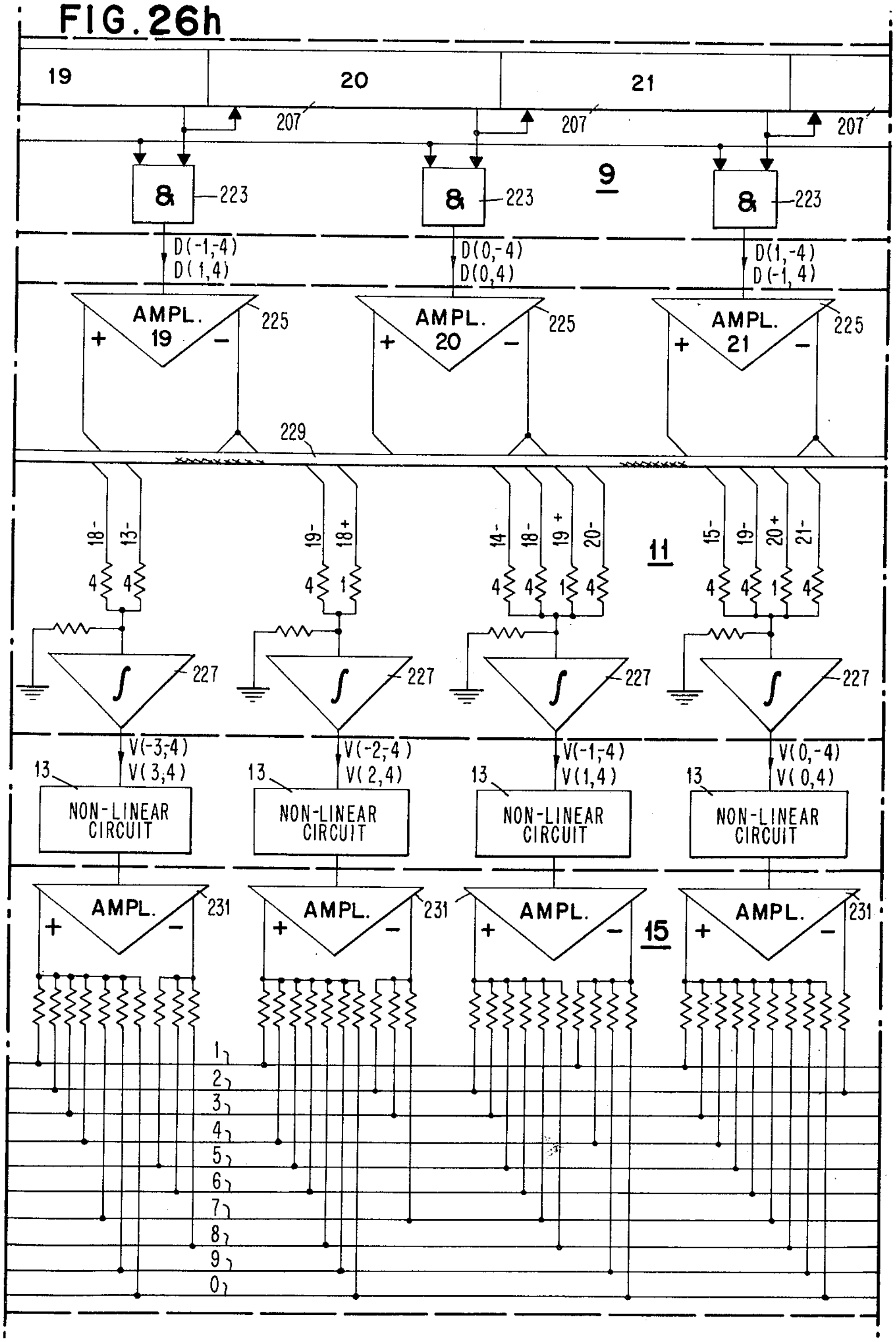
Figure 26I:
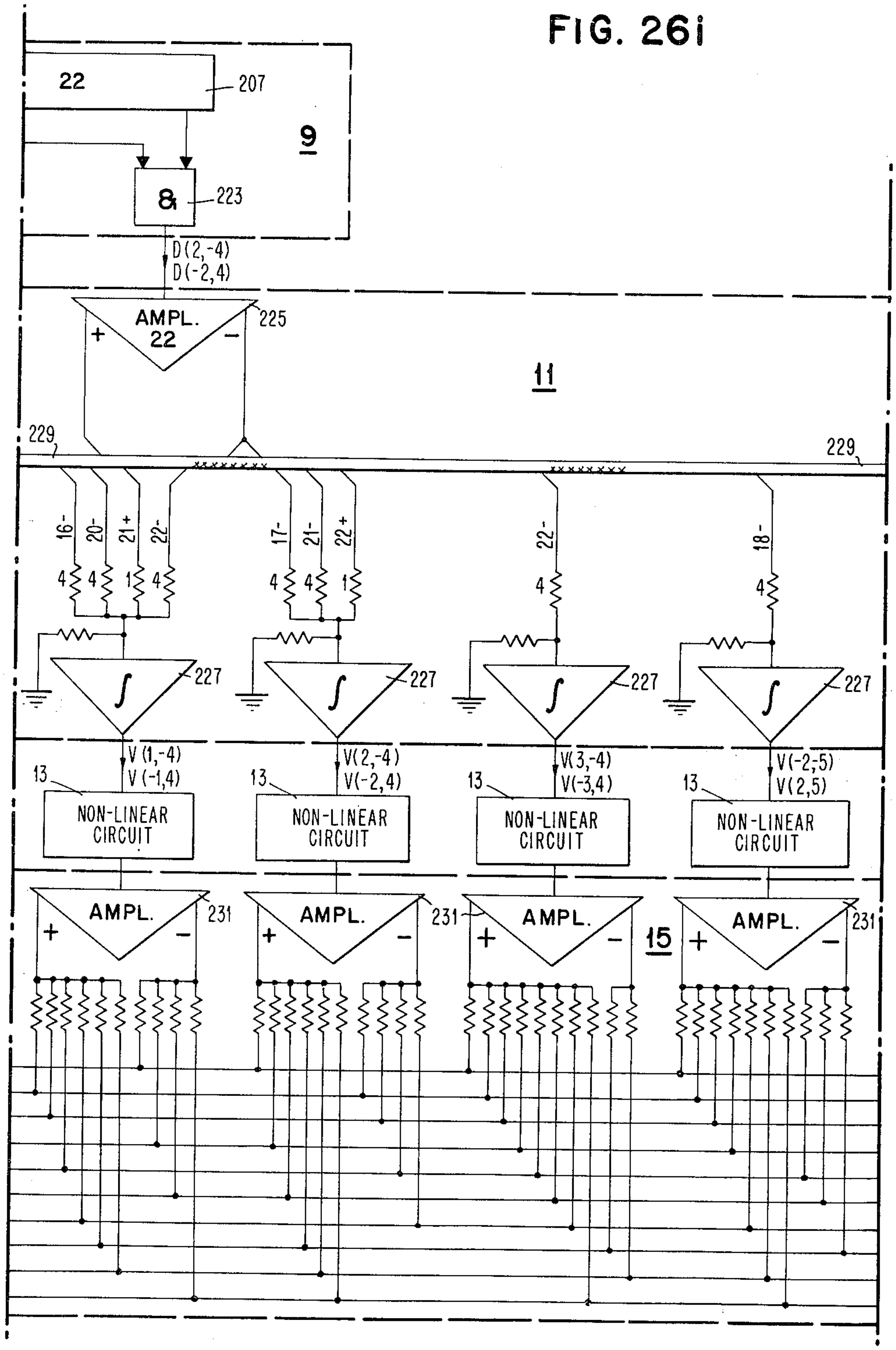
Figure 26J:
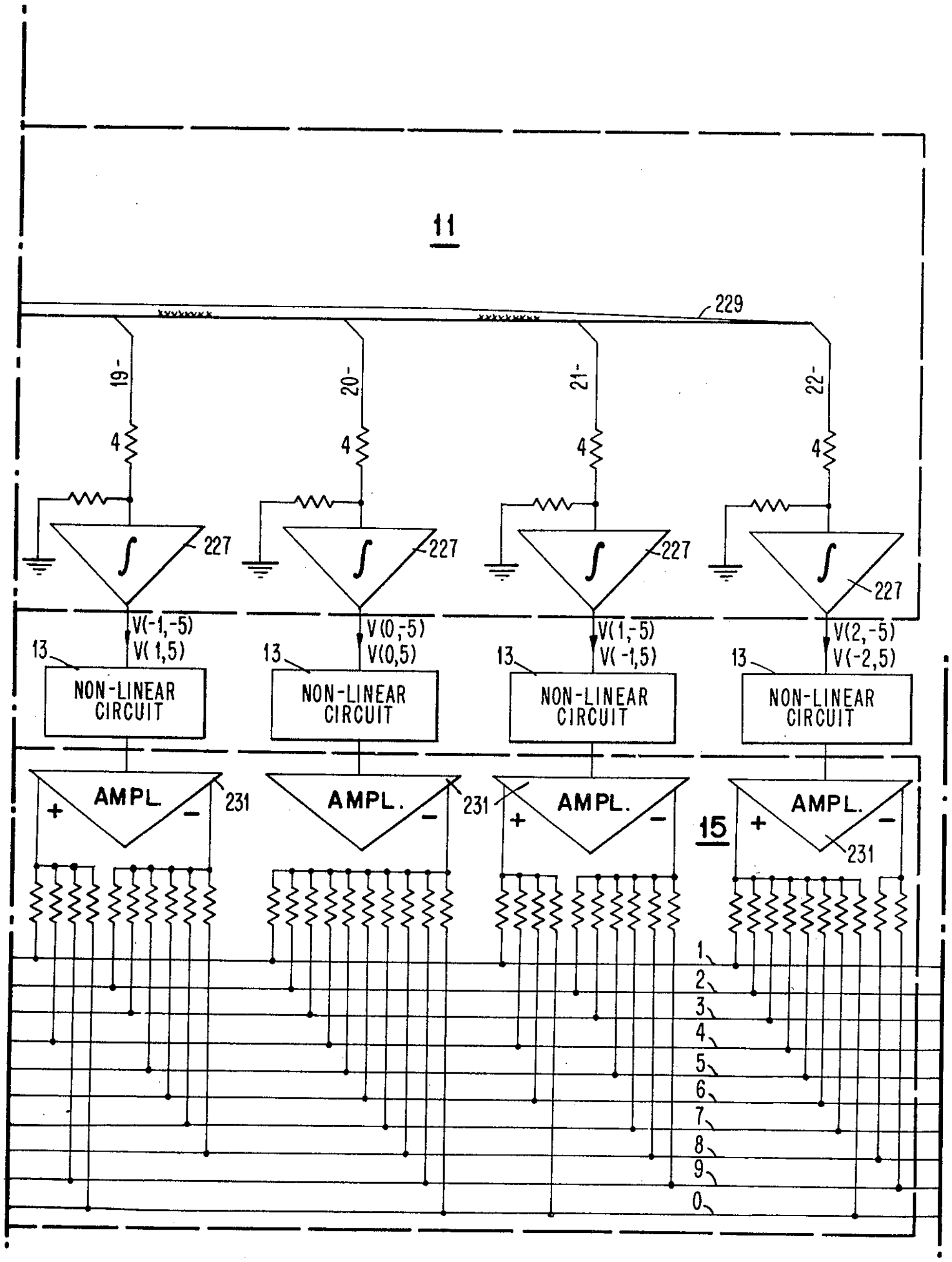

Several of the integrators have less than five inputs because the "second-difference" operator matrix, when centered on the peripheral row and columns or outside of the autocorrelation function matrix (FIGURE 11), provides less than five non-trivial products. For example, when generating V(3, −2) as shown in FIGURE 26*f*, the only product required is −1[−D(2, −2)].

The integrator which generates V(0, 0) shown in FIGURE 22*a* has three inputs rather than five because the sum $$4D(0,0)-D(1,0)-D(-1,0)-D(0,1)-D(0,-1)$$

includes two pairs of identical products: the pair D(1, 0) and (D(−1, 0) and the pair D(0, 1) and D(0, −1). These pairs are identical due to the symmetry of the autocorrelation function. For this reason, the integrator input resistors that are connected to amplifiers "1−" and "5−" have relative ohmic values of 2 to double their relative weighting.

Two sums V(−3, −5) and V(3, −5) and their equivalents V(3, 5) and V(−3, 5) are not generated since they are always zero, and hence, regardless of the reference patterns, their associated binary functions always assume the value +1 and contribute nothing toward discrimination.

The analog output signals V(*x'*, *y'*) of the integrators are applied to non-linear (threshold) circuits 13 of the type described with respect to FIGURE 21. These circuits generate binary outputs V*(*x'*, *y'*) that are +1 or −1 as shown in the charts in FIGURE 12.

A reference storage resistor matrix 15 generates the function $S_{S,R}$ which has been defined as:

$$\sum_{x',y'} V_S^*(x',y')V_R^*(x',y)$$

This circuit 15 contains a group of amplifiers 231 having in-phase outputs (labelled "+") and out-of-phase outputs (labelled "−") which are applied through equal-valued resistors to the appropriate horizontal output lines. The resistors are of equal value because all signals have an amplitude of 1. The input to the amplifier represents $V_S^*(x', y')$ and the resistor connections are determined by $V_R^*(x', y')$ as shown in the charts in FIGURE 12. The summation is accomplished across the common summing resistors connecting the horizontal output lines to ground in FIGURE 22*a*. Since normalization has been shown to be unnecessary, these resistors are also equal to each other in ohmic value. The resistor connections (from the amplifiers 231) are dependent upon the particular patterns which the system is designed to identify. A method of obtaining the values shown in the charts in FIGURE 12 has been described and one skilled in the art could modify the resistor connections in the embodiment shown in FIGURE 22 to provide identification of any specimens. As described above, the output connections of the amplifiers 231 are dependent upon the $V_R^*(x', y')$ charts in FIGURE 12. For example, the positive output of the third amplifier in FIGURE 26*e* (representing $V_R^*(1, -2)$ and $V_R^*(-1, 2)$ is connected to horizontal output leads "2," "4," "6," "7," "9" and "0" and the negative output is connected to leads "1," "3," "5" and "8." Referring to the (1, −2) position of the $V_R^*(x', y')$ charts in FIGURE 12, it is seen that a "1" occurs in the charts corresponding to "2," "4," "6," "7," "9" and "0"; and a "−1" occurs for "1," "3," "5" and "8.".

Since the positive output of amplifier 231 is FIGURE 26*a*, representing V*(0, 0), is connected to all horizontal output leads, it contributes nothing to the system discrimination and could be deleted as shown with respect to the functions V*(−3, −5); V*(3, −5); V*(3, 5) and V*(−3, 5). It may also be noted that the negative output of the amplifier representing V*(0, −5) and V*(0, 5) is connected to all horizontal leads and may be deleted, but in this case, this is due to the configurations of the particular reference patterns used.

Figure 26K:
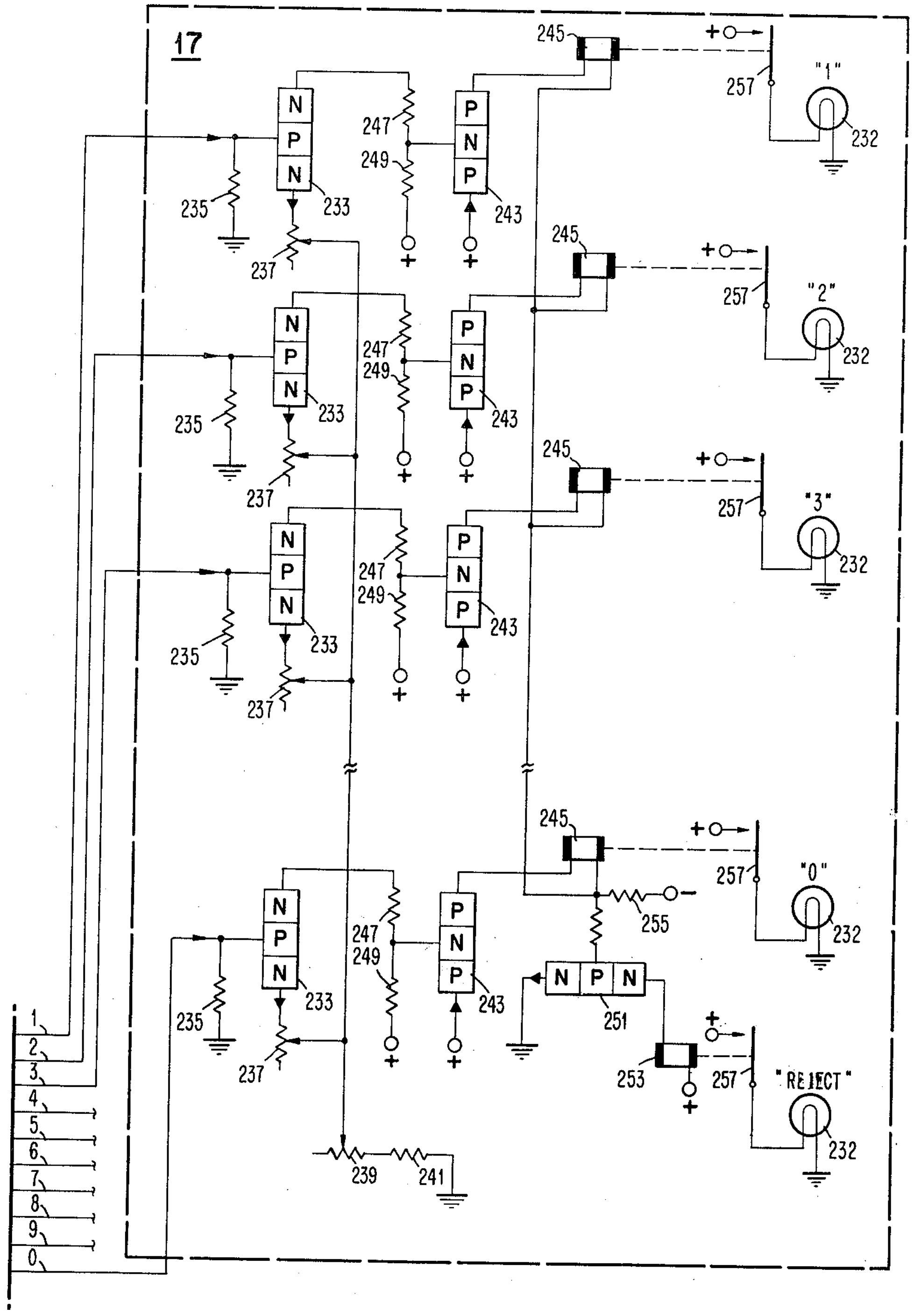

A maximum signal indicator circuit 17, shown in FIGURE 26*k* accepts the analog voltages present on the horizontal output leads and causes an output indicator lamp 232 to be lighted which is indicative of the identity of the specimen. A reject indicator lamp is also provided and is lighted if the largest input signal is not sufficiently greater than the second largest signal.

The input signals are applied to the base connections of a group of NPN type transistors 233. Each transistor base circuit includes a resistor 235 to protect the transistor in the case of a disconnected input signal. The emitter-base connection of the transistors provides a diode action that, in conjunction with resistors 237, and a common path for current including resistors 239 and 241, permits current flow only to the transistor base to which the most positive signal is applied. The voltage drop across resistors 239 and 241 back-biases, the transistors 233 associated with the less positive input signals, preventing current flow in their base circuits. The sensitivity of the circuit is defined as the amount that the most positive input signal must exceed the adjacent signal (second most positive signal) to back-bias the transistor associated with the latter signal. The sensitivity is controlled by the setting of resistor 239. Resistors 237 are adjusted to provide a constant and equal emitter resistance for all of the transistors 233 regardless of the setting of resistor 239. As the common resistance in the emitter circuits is varied by a change in the setting of resistor 239, the settings of resistors 237 are changed in the opposite direction to maintain a constant total emitter resistance. Resistors 237 may be controlled simultaneously with control of resistor 239 by the use of a common control shaft. The minimum common resistance in the emitter circuit is determined by the fixed resistor 241. If the resistance of resistor 241 is labelled $R_{241}$, the active resistance of resistor 239 is labelled $R_{239}$, the active resistance of resistor 237 is labelled $R_{237}$ and the emitter-base resistance of a transistor 233 is labelled $R_{233}$, than the smallest ratio between the amplitudes of the most positive signal $E_i$ and the adjacent signal $E_j$ that may be tolerated without indicating a reject is approximately:

$$\frac{R_{233}+R_{237}+R_{239}+R_{241}}{R_{238}+R_{241}}$$

Only the transistor associated with the most positive input signal is permitted to conduct if the most positive signal exceeds the adjacent signal by an amount greater than the sensitivity of the system.

The output of the conducting transistor 233 is applied to an associated PNP transistor switch 243 which, in turn, provides current to operate a relay 245 associated with the largest input signal. A group of resistors 247 provide protection for transistors 233 and 243. A second group of resistors 249 provide a path for leakage current in the base circuits of transistors 243.

A reject circuit containing a transistor 251 and the reject relay 253 operates when the largest two or more applied signals are approximately equal. This condition causes two or more relays 245 to operate. Transistor 32 is ordinarily non-conducting due to the negative voltage at its base (which is equal to the supply voltage applied to a resistor 255 less the voltage drop across the resistor). When two or more relays 245 are operated simultaneously, a sufficient current flows in resistor 255 to provide a voltage to the base of transistor 251 which is above its cut-off value and the transistor conducts, operating relay 253. Each relay has contacts 257 which control the operation of the indicator 232.

A second embodiment of the invention makes use of the shift register 207 and "and" gate 223 that have been described with respect to FIGURE 26 in conjunction with a group of digital circuits of the type shown in FIGURE 28. One of these circuits is used for each function $V^*(x', y')$.

The specimen autocorrelation function elements $D_S(x', y')$ from each "and" gate 223 are applied directly to the cable 229. Although all signals from the cable 229 are of the same polarity because the amplifiers 255 (FIGURE 26) are not used in this embodiment, one leads is labelled "+" and the remaining leads are labelled "—" to correspond to the labelling in FIGURE 26. This labelling permits only one digital circuit to be shown in FIGURE 28 and the lead indications shown as FIGURE 26 are used to establish the input connections. For example, the circuit shown on the right hand side of FIGURE 26*f* (which generates the signal $V(-1, -3)$) may be converted into a digital circuit of the type shown in FIGURE 28 by connecting the digital circuit to the "and" gate 223 outputs representing $D(-1, -2)$ $D(-2, -3)$; $D(-1, -3)$ $D(0, -3)$ and $D(-1, -4)$ which correspond to the amplifiers 225 (FIGURE 26) labelled "9," "13," "14," "15" and "19." Since, in FIGURE 26, the $D(-1, -3)$ connecting lead labelled (14+) contains a "+" sign and the remaining four leads contain "—" signs, in FIGURE 28, the lead designated + (from the cable 229) is connected to the signal $D(-1, -3)$ and the leads designated — are connected, in any order, to the remaining four signals; $D(-1, -2)$ $D(-2, -3)$ $D(0, -3)$ and $D(-1, -4)$. In those cases where the embodiment of FIGURE 26 indicates that less than five inputs are applied to the integrators 227, correspondingly less connections are made in FIGURE 28. One exception to the above conversion technique applies to the circuit generating the signal $V(0, 0)$ which is shown in FIGURE 26*a*. Since the connections labelled "1—" "5—" are applied to the integrator through resistors with relative ohmic values of 2 (instead of 4, as in the other integrator input circuits, to compensate for the corresponding signals being applied to the integrator once each, instead of twice each) these signals must each be applied to two leads designated "—" in FIGURE 28.

The five leads from the cable 229 (FIGURE 28) are sequentially sampled by "and" gates 301 under the control of clock pulses on leads labeled $\phi1$, $\phi2$, $\phi3$, $\phi4$, $\phi5$. The pulses on these leads occur at the same repetition rate as the clock pulse input to the circuit but are out of phase with each other due to the action of delays 303. The "and" gate 301 outputs corresponding to the leads labelled "—" are combined in an "or" gate 305 and applied as the input to the $2^0$ section of an up-down counter 307, of the type described with respect to FIGURE 22. The "and" gate 301 output corresponding to the lead designated "+" is applied to the $2^2$ section of the counter and thus automatically receives a weight of $2^2(4)$. Due to the use of out-of-phase clock pulses, only one input is applied to the counter at a given time, permitting its computations to be made in the time between the application of the input signals. The direction of count is controlled by the $\phi5$ clock pulses such that the counter counts up when a signal on the lead labelled "+" (from cable 229) is applied, and down when signals on the leads labelled "—" are applied. In this manner, the "second-difference" function is generated, following the procedure outlined with respect to FIGURE 11. The non-linear circuit 12 (FIGURE 26) is not required in the embodiment of FIGURE 28 because this function is inherently achieved by using only the highest-order ($2^7$) output of the counter 307 as the input to the comparator circuits. This signal thus represents the binary function $V_S^*(x', y')$.

A binary storage circuit 311 (of the type shown in FIGURE 23) stores signals representing the reference function $V_R^*(x', y')$. These signals and the specimen function $V_S^*(x', y')$ signals are compared in binary comparators 313, of the type shown in FIGURE 25, such that a positive voltage is generated when they are similar and a negative voltage is generated when they differ. These voltages are applied to the horizontal output leads (which correspond to those shown in FIGURE 26) and then to a maximum signal indicator (also shown in FIGURE 26). The horizontal output lead containing the largest signal is then indicative of the identity of the specimen.

The simplification of circuitry that is made possible by the use of a binary function is especially apparent when considering the digital embodiment. Simple binary counters and comparators can be used rather than more complicated higher-order circuitry. Since digital circuits are often more reliable and more accurate than analog circuits, the large reduction in circuit complexity afforded by the use of a binary function is significant. The dynamic range of discrimination is also enhanced (lower) by using a binary function. Thus, the present invention provides for highly-reliable and economical specimen identification.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A specimen identification apparatus comprising, in combination: means for generating a binary function of an autocorrelation function of specimen data located throughout the specimen, and means for comparing this function with binary functions of autocorrelation functions of reference patterns, for identifying the specimen.

2. A specimen identification apparatus comprising, in combination: means for generating a binary function of a discriminating function of the autocorrelation function of the specimen, and means for comparing this function with binary functions of discriminating functions of autocorrelation functions of reference patterns for identifying the specimen.

3. A specimen identification apparatus comprising, in combination: means for generating a binary function of a "second-difference" function of the autocorrelation function of the specimen, and means for comparing this function with binary functions of "second-difference" functions of autocorrelation functions of reference patterns for identifying the specimen.

4. A specimen identification apparatus comprising, in combination: electronic means for generating a binary function of an autocorrelation function of specimen data located throughout the specimen; and electronic means for comparing this function with binary functions of autocorrelation functions of reference patterns for identifying the specimen.

5. A specimen identification apparatus comprising, in combination: input means including a surface light scanning device and a light-sensitive device having an output $f(x, y)$ indicative of the specimen; means for generating a "second-difference" function $V_S(x', y')$ of the autocorrelation function of the specimen indication $f(x, y)$; means responsive to the "second-difference" function $V_S(x', y')$ of the autocorrelation function of the specimen indication for generating a binary function $V_S^*(x', y')$ of the "second-difference" function; means for developing the sums $S_{S,R}$ for all reference patterns R, where $$S_{S,R}=\frac{\sum_{x',y'} V_S^*(x', y')\cdot V_R^*(x', y')}{\left[\sum_{x',y'} V_R^{*2}(x', y')\right]^{1/2}}$$

and where $V_R^*(x', y')$ is a binary function of a "second-difference" function $V_R(x', y')$ is the autocorrelation function of a referenced pattern R; and means for indicating the largest of said sums, which is indicative of the identity of the specimen.

6. A specimen identification apparatus comprising, in combination: input means including a surface light scanning device and a light-sensitive device having an output $f(x, y)$ indicative of the specimen; means for generating an autocorrelation function $D_S(x', y')$ of the specimen indication $f(x, y)$; a binary operator responsive to the autocorrelation function $D_S(x', y')$ of the specimen for generating a binary function $D_S^*(x', y')$ of the autocorrelation function; means for developing the sums $S_{S,R}$ for all reference patterns R, where $$S_{S,R}=\frac{\sum_{x',y'} D_S^*(x', y')\cdot D_R^*(x',y')}{\left[\sum_{x',y'} D_R^{*2}(x', y')\right]^{1/2}}$$

and where $D_R^*(x', y')$ is a binary function of the autocorrelation function $D_R(x', y')$ of a reference pattern R; and means for providing an indication of the largest of the sums, which is an indication of the identity of the specimen.

7. A specimen identification apparatus comprising, in combination: input means including a surface light scanning device and a light sensitive device having an output $f(x, y)$ indicative of the specimen; means for generating a discriminating function $V_S(x', y')$ of the specimen indication $f(x, y)$; a binary operator responsive to the discriminating function $V_S(x', y')$ of the autocorrelation function $D_S(x', y')$ of the specimen indication for generating a binary function $V_S^*(x', y')$ of the discriminating function; means for developing the sums $S_{S,R}$ for all reference patterns R, where $$S_{S,R}=\frac{\sum_{x',y'} V_S^*(x', y')\cdot V_R^*(x', y')}{\left[\sum_{x',y,} V_R^{*2}(x', y')\right]^{1/2}}$$

and where $V_R^*(x', y')$ is a binary function of a "second-difference" function $V_R(x', y')$ of the autocorrelation function $D_R(x', y')$ of a reference pattern R; and means for indicating the largest of said sums, which is indicative of the identity of the specimen when the ratio of the largest and second largest sums exceeds a predetermined amount, and for providing a "reject" indication when the ratio is insufficient.

8. A specimen identification apparatus comprising, in combination: timing means; input means responsive to said timing means, including a flying-spot scanner and a phototube, for scanning the specimen and providing an output signal $f(x, y)$ indicative of the specimen; a shift register responsive to the signal $f(x, y)$ and to the timing means, and having a plurality of output signals indicative of the specimen and differing from each other only in time; a plurality of two input coincidence means, each having one input connected to the signal $f(x, y)$ from the input means, and each having one input connected to one of said plurality of output signals from the shift register, for generating a plurality of output signals $D_S(x', y')$ indicative of the autocorrelation function of the specimen; a "second-difference" operator circuit, comprising a plurality of integrators with input resistance networks, each responsive to at least one of the output signals $D_S(x', y')$ for generating output signals $V_S(x', y')$ indicative of the "second-difference" function of the autocorrelation function of the specimen; a plurality of binary threshold circuits, each responsive to one of said signals $V_S(x', y')$ for generating output signals $V_S^*(x', y')$ indicative of a binary function of the "second-difference" function of the autocorrelation function of the specimen; a reference storage resistor matrix responsive to said signals $V_S^*(x', y')$ for generating normalized sums $S_{S,R}$ for each reference R where:

$$S_{S,R}=\frac{\sum_{x',y'} V_S^*(x', y')\cdot V_R^*(x', y')}{\left[\sum_{x',y'} V_R^{*2}(x', y')\right]^{1/2}}$$

and where $V_R^*(x', y')$ represents a binary function of the "second-difference" function of the autocorrelation function of a reference pattern R; and maximum signal indicating means responsive to the sums $S_{S,R}$ for providing an indication of the largest of the sums, which is indicative of the identity of the specimen when the ratio of the largest and second largest sums exceeds a predetermined amount, and for providing a "reject" indication when the ratio is insufficient.

9. A specimen identification apparatus comprising, in combination: means for generating a binary function of an autocorrelation function of specimen data located throughout the specimen where the binary function assumes a first value where the autocorrelation function has a value on one side of a predetermined threshold and where the binary function assumes a second value where the autocorrelation function has a value on the other side of the predetermined threshold; and means for comparing this binary function with a binary function of each of a plurality of reference patterns to identify the specimen.

10. A specimen identification apparatus comprising, in combination: means for generating the autocorrelation function of the specimen; means for generating a binary function of the autocorrelation function of specimen data located throughout the specimen where the binary function assumes a first value where the autocorrelation function has a value on one side of a predetermined threshold and where the binary function assumes second value where the autocorrelation function has a value on the other side of the predetermined threshold and means for comparing this binary function with a binary function of each of a plurality of reference patterns to identify this specimen.

11. A specimen identification apparatus comprising, in combination: means for generating a discriminating function of the autocorrelation function of the specimen; means for generating a binary function of the discriminating function of the autocorrelation function of the specimen where the binary function assumes a first value where the discriminating function of the autocorrelation function has a value on one side of a predetermined threshold and where the binary function assumes a second value where the discriminating function of the autocorrelation function has a value on the other side of the predetermined threshold; and means for comparing this binary function with a binary function of each of a plurality of reference patterns to identify the specimen.

12. A specimen identification apparatus comprising, in combination: means for generating a "second-difference" function of the autocorrelation function of the specimen; means for generating a binary function of the "second-difference" function of the autocorrelation function of the specimen where the binary function assumes a first value where the "second-difference" function of the autocorrelation function has a value on one side of a predetermined threshold and where the binary function assumes a second value where the "second-difference" function of the autocorrelation function has a value on the other side of the predetermined threshold; and means for comparing this binary function with a binary function of each of a plurality of reference patterns to identify the specimen.

13. A specimen identification apparatus comprising, in combination: means for generating a "second-difference" function of the autocorrelation function of the specimen; means for generating a binary function of the "second-difference" function of the autocorrelation function of the specimen where the binary function assumes a first value where the "second-difference" function of the autocorrelation function has a value in the range of values including the value zero and values of a first polarity and where the binary function assumes a second value where the "second-difference" function of the autocorrelation function has a value of a second polarity; and means for comparing this binary function with a binary function of each a plurality of reference patterns to identify the specimen.

14. A specimen identification apparatus comprising, in combination: means for generating a "second-difference" function of the autocorrelation function of the specimen; means for generating a binary function of the "second-difference" function of the specimen where the binary function assumes a first value where the "second-difference" function of the autocorrelation function has a value in the range of values including the value zero and all positive values and where the binary function assumes a second value where the "second-difference" function of the autocorrelation function has a value that is negative; and means for comparing this binary function with a function of each of a plurality of reference patterns to identify the specimen.

15. A specimen identification apparatus comprising, in combination: timing means; input means responsive to said timing means, including a flying-spot scanner and a phototube, for scanning the specimen and providing an output signal $f(x, y)$ indicative of the specimen; a shift register responsive to the signal $f(x, y)$ and to the timing means, and having a plurality of output signals indicative of the specimen and differing from each other only in time; a plurality of two input coincidence means, each having one input connected to the signal $f(x, y)$ from the input means, and each having one input connected to one of said plurality of output signals from the shift register, for generating a plurality of output signals indicative of elements of the autocorrelation functions $D(x', y')$ of the specimen; a plurality of means, each comprising a digital counter and each responsive to output signals from preselected coincidence means for generating binary output signals $V_S^*(x', y')$ indicative of a binary function of the "second-difference" function of the autocorrelation function of the specimen; a plurality of means, each for storing representations of corresponding binary functions $V_R^*(x', y')$ of "second-difference" functions of autocorrelation functions of reference patterns; a plurality of means, each responsive to a signal $V_S^*(x', y')$ and to a corresponding representation $V_R^*(x', y')$ and each for generating a corresponding product $V_S^*(x', y') \cdot V_R^*(x', y')$; a plurality of means, each for summing all products corresponding to one of the reference patterns; and maximum signal indicating means responsive to the sums $S_{S,R}$ for providing an indication of the largest of the sums, which is indicative of the identity of the specimen when the ratio of the largest and second largest sums exceeds a predetermined amount, and for providing a "reject" indication when the ratio is insufficient.

16. A specimen identification apparatus comprising, in combination: input means including a surface light scanning device and a light-sensitive device having an output $f(x, y)$ indicative of the specimen; means for generating a "second-difference" function $V_S(x', y')$ of the autocorrelation function of the specimen indication $f(x, y)$; means responsive to the "second-difference" function $V_S(x', y')$ of the autocorrelation function of the specimen indication for generating a binary function $V_S^*(x', y')$ of the "second-difference" function; means for developing the sums $S_{S,R}$ for all reference patterns R where $$S_{S,R}=\sum_{x',y'} V_S^*(x', y') \cdot V_R^*(x', y')$$

and where $V_R^*(x', y')$ is a binary function of a "second-difference" function $V_R(x', y')$ is the autocorrelation function of a reference pattern R; and means for indicating the largest of said sums, which is indicative of the identity of the specimen.

17. A specimen identification apparatus comprising, in combination: input means including a surface light scanning device and a light-sensitive device having an output $f(x,y)$ indicative of the specimen; means for generating an autocorrelation function $D_S(x',y')$ of the specimen indication $f(x,y)$; a binary operator responsive to the autocorrelation function $D_S(x',y')$ of the specimen for generating a binary function $D_S^*(x',y')$ of the autocorrelation function; means for developing the sums $S_{S,R}$ for all reference patterns R, where $$S_{S,R}=\sum_{x',y'} D_S^*(x', y') \cdot D_R^*(x', y')$$

and where $D_R^*(x',y')$ is a binary function of the autocorrelation function $D_R(x',y')$ of a reference pattern R; and means for providing an indication of the largest of the sums, which is an indication of the identity of the specimen.

18. A specimen identification apparatus comprising, in combination: input means including a surface light scanning device and a light-sensitive device having an output $f(x,y)$ indicative of the specimen; means for generating an autocorrelation function $D_S(x',y')$ of the specimen indication $f(x,y)$; a binary operator responsive to the autocorrelation function $D_S(x',y')$ of the specimen for generating a binary function $D_S^*(x',y')$ of the autocorrelation function; means for developing the sums $S_{S,R}$ for all reference patterns R where $$S_{S,R}=\sum_{x',y'} D_S^*(x', y') \cdot D_R(x', y')$$

and where $D_R^*(x',y')$ is a binary function of the autocorrelation function $D_R(x',y')$ of a reference pattern R; and means for providing an indication of the largest of the sums, which is an indication of the identity of the specimen when the ratio of the largest and second largest sums exceeds a predetermined amount, and for providing a "reject" indication when the ratio is insufficient.

19. A specimen identification apparatus comprising, in combination: input means including a surface light scanning device and a light-sensitive device having an output $f(x,y)$ indicative of the specimen; means for generating a discriminating function $V_S(x', y')$ of the specimen indication $f(x,y)$; a binary operator responsive to the discriminating function $V_S(x',y')$ of the autocorrelation function $D_S(x',y')$ of the specimen indication for generating a binary function $V_S^*(x',y')$ of the discriminating function; means for developing the sums $S_{S,R}$ for all reference patterns R where $$S_{S,R}=\sum_{x',y'} V_S^*(x',y')\cdot V_R^*(x',y')$$

and where $V_R^*(x',y')$ is a binary function of a "second-difference" function $V_R(x',y')$ of the autocorrelation function $D_R(x',y')$ of a reference pattern R; and means for indicating the largest of said sums, which is indicative of the identity of the specimen when the ratio of the largest and second largest sums exceeds a predetermined amount, and for providing a "reject" indication when the ratio is insufficient.

20. A specimen identification apparatus comprising, in combination: timing means; input means responsive to said timing means, including a flying-spot scanner and a phototube, for scanning the specimen and providing an output signal $f(x,y)$ indicative of the specimen; a shift register responsive to the signal $f(x,y)$ and to the timing means, and having a plurality of output signals indicative of the specimen and differing from each other only in time; a plurality of two input coincidence means, each having one input connected to the signal $f(x,y)$ from the input means, and each having one input connected to one of said plurality of output signals from the shift register, for generating a plurality of output signals $D_S(x',y')$ indicative of the autocorrelation function of the specimen; a "second-difference" operator circuit, comprising a plurality of integrators with input resistance networks, each responsive to at least one of the output signals $D_S(x',y')$ for generating output signals $V_S(x',y')$ indicative of the "second-difference" function of the autocorrelation function of the specimen; a plurality of binary threshold circuits, each responsive to one of said signals $V_S(x',y')$ for generating output signals $V_S^*(x',y')$ indicative of a binary function of the "second-difference" function of the autocorrelation function of the specimen; a reference storage resistor matrix responsive to said signals $V_S^*(x',y')$ for generating sums $S_{S,R}$ for each reference R where:

$$S_{S,R}=\sum_{x',y'} V_S^*(x',y')\cdot V_R^*(x',y')$$

and where $V_R^*(x',y')$ represents a binary function of the "second-difference" function of the autocorrelation function of a reference pattern R; and maximum signal indicating means responsive to the sums $S_{S,R}$ for providing an indication of the largest of the sums, which is indicative of the identity of the specimen when the ratio of the largest and second largest sums exceeds a predetermined amount, and for providing a "reject" indication when the ratio is insufficient.

21. An apparatus for identifying a specimen located in a document area, comprising in combination: means for generating a multi-valued representation of the document area, where each element of data corresponds to a predetermined location on the document and where the value of each element is determined by the relative intensity of the document at this location; means for analyzing the multi-valued data representation for data corresponding to pairs of predetermined data values at predetermined relative locations throughout the document area, to generate a registration-invariant function of the specimen; means for generating a binary function of the generated registration-invariant function; and means for comparting the generated binary function to similar functions of reference patterns, to identify the specimen.

22. An apparatus for identifying a specimen located in a document area, comprising in combination: means for generating a binary data representation of the document area where each element of data corresponds to a predetermined location on the document, and where each element corresponding to a location within the specimen has a first binary value and where each element corresponding to a location outside of the specimen has a second binary value; means for analyzing the binary data representation for data corresponding to pairs of predetermined data values at predetermined relative locations throughout the document area, to generate a registration-invariant function of the specimen; means for generating a binary function of the generated registration-invariant function; and means for comparing the generated binary function to similar functions of reference patterns, to identify the specimen.

23. An apparatus for identifying a specimen located in a document area, comprising in combination: means for generating a multi-valued representation of the document area, where each element of data corresponds to a predetermined location on the document and where the value of each element is determined by the relative intensity of the document at this location; means for analyzing the multi-valued data representation for data corresponding to combinations of predetermined data values at predetermined relative locations throughout the document area, to generate a registration-invariant function of the specimen; means for generating a binary function of the generated registration-invariant function; and means for comparing the generated binary function to similar functions of reference patterns, to identify the specimen.

24. An apparatus for identifying a specimen located in a document area, comprising in combination: means for generating a binary data representation of the document area where each element of data corresponds to a predetermined location on the document, and where each element corresponding to a location within the specimen has a first binary value and where each element corresponding to a location outside of the specimen has a second binary value; means for analyzing the binary data representation for data corresponding to combinations of predetermined data values at predetermined relative locations throughout the document area, to generate a registration-invariant function of the specimen; means for generating a binary function of the generated registration-invariant function; and means for comparing the generated binary function to similar functions of reference patterns, to identify the specimen.

25. An apparatus for identifying a specimen located in a document area, comprising in combination: means for generating a binary data representation of the document area where each element of data corresponds to a predetermined location on the document, and where each element corresponding to a location within the specimen has a first binary value and where each element corresponding to a location outside of the specimen has a second binary value; means for analyzing the binary data representation for data corresponding to combinations of predetermined data values at predetermined relative locations throughout the document area to generate a registration-invariant function of the specimen; means for generating a binary function of the generated registration-invariant function;

and means responsive to the generated binary function for providing an indication of the identity of the specimen.

References Cited by the Examiner

UNITED STATES PATENTS

| | | | |
|---|---|---|---|
| 2,959,769 | 11/60 | Greanias. | |
| 2,968,789 | 1/61 | Weiss et al. | 235—61.11 X |
| 2,978,675 | 4/61 | Highleyman | 235—61.11 X |
| 2,985,298 | 5/61 | Schreiner | 340—149 |
| 3,008,123 | 11/61 | Rohland. | |
| 3,064,519 | 11/62 | Shelton. | |

OTHER REFERENCES

W. L. Bragg, "Lightning Calculations With Light," published by Nature 154, pp. 69–72, July 15, 1944.

J. S. Bomba: Proceedings EJCC, December 1959, pp. 218–224.

L. A. Kamentsky: Proceedings WJCC, March 1959, pp. 304–309.

MALCOLM A. MORRISON, *Primary Examiner.*

WALTER W. BURNS, Jr., *Examiner.*